US007479982B2

(12) United States Patent
Otani et al.

(10) Patent No.: US 7,479,982 B2
(45) Date of Patent: Jan. 20, 2009

(54) DEVICE AND METHOD OF MEASURING DATA FOR CALIBRATION, PROGRAM FOR MEASURING DATA FOR CALIBRATION, PROGRAM RECORDING MEDIUM READABLE WITH COMPUTER, AND IMAGE DATA PROCESSING DEVICE

(75) Inventors: Hitoshi Otani, Tokyo (JP); Nobuo Kochi, Tokyo (JP); Takayuki Noma, Tokyo (JP)

(73) Assignee: Topcon Corporation, Tokyo (JP)

( * ) Notice: Subject to any disclaimer, the term of this patent is extended or adjusted under 35 U.S.C. 154(b) by 922 days.

(21) Appl. No.: 10/612,404

(22) Filed: Jul. 3, 2003

(65) Prior Publication Data
US 2004/0066454 A1 Apr. 8, 2004

(30) Foreign Application Priority Data
Jul. 3, 2002 (JP) ............................. 2002-195058

(51) Int. Cl.
*H04N 13/04* (2006.01)
*H04N 15/00* (2006.01)
*H04N 17/00* (2006.01)
(52) U.S. Cl. .................... 348/188; 348/51; 348/175; 348/176; 348/180; 348/187
(58) Field of Classification Search ................ 348/51, 348/175, 176, 180, 187, 188
See application file for complete search history.

(56) References Cited
U.S. PATENT DOCUMENTS
4,760,447 A * 7/1988 Koka et al. .................. 348/184

(Continued)

FOREIGN PATENT DOCUMENTS
DE 195 36 297 A1 4/1997

(Continued)

OTHER PUBLICATIONS

T. Noma et al., "New System of Digital Camera Calibration. DC-100", Survey Architecture System Exhibition, released on Jul. 4, 2002, (no page numbers).

(Continued)

*Primary Examiner*—Brian P Yenke
(74) *Attorney, Agent, or Firm*—Foley & Lardner LLP

(57) ABSTRACT

A device for measuring data for calibration for obtaining data for calibration of a camera 2 capable of varying its optical conditions, wherein the data for calibration are obtained using a plurality of images of a calibration chart 1 having marks arranged thereon which were photographed with the camera 1 under varied optical conditions, comprising: a mark extracting part 131 for extracting the marks from the images of the chart; an internal parameter calculating part 134 for calculating data for calibration under optical conditions under which the images of the chart were photographed based on the positions of the marks extracted by the mark extracting part and a plurality of conditions under which the images of the chart were photographed; and an internal parameter function calculating part 160 for calculating data for calibration corresponding to the varied optical photographing conditions of the camera 2, using the data for calibration calculated in the internal parameter calculating part and a plurality of optical conditions under which the images of the chart were photographed. The device can remove the effect of lens distortion from an image photographed with a camera capable of varying its optical conditions.

15 Claims, 20 Drawing Sheets

U.S. PATENT DOCUMENTS

| | | | |
|---|---|---|---|
| 5,699,440 A * | 12/1997 | Carmeli | 382/100 |
| 5,821,993 A * | 10/1998 | Robinson | 348/187 |
| 5,850,352 A * | 12/1998 | Moezzi et al. | 345/419 |
| 6,437,823 B1 * | 8/2002 | Zhang | 348/187 |
| 6,456,339 B1 * | 9/2002 | Surati et al. | 348/745 |
| 6,542,185 B1 * | 4/2003 | Bogardus | 348/223.1 |
| 6,654,493 B1 * | 11/2003 | Hilliard et al. | 382/167 |
| 6,768,509 B1 * | 7/2004 | Bradski et al. | 348/207.99 |
| 6,798,446 B2 * | 9/2004 | Maggi | 348/207.99 |
| 6,816,187 B1 * | 11/2004 | Iwai et al. | 348/187 |
| 7,023,472 B1 * | 4/2006 | Kang et al. | 348/187 |
| 7,023,473 B2 * | 4/2006 | Iwai et al. | 348/187 |
| 7,071,966 B2 * | 7/2006 | Lu et al. | 348/188 |
| 7,151,560 B2 * | 12/2006 | Matherson et al. | 348/187 |
| 7,155,030 B2 * | 12/2006 | Kim et al. | 382/100 |
| 7,196,721 B2 * | 3/2007 | Uchiyama | 348/187 |
| 7,227,592 B2 * | 6/2007 | Waters et al. | 348/745 |
| 7,301,560 B2 * | 11/2007 | Noma et al. | 348/187 |
| 2001/0045980 A1 * | 11/2001 | Leonard | 348/129 |
| 2002/0041383 A1 | 4/2002 | Lewis, Jr. et al. | |
| 2003/0007077 A1 * | 1/2003 | Maggi | 348/223.1 |
| 2003/0222984 A1 * | 12/2003 | Zhang | 348/187 |
| 2004/0189805 A1 * | 9/2004 | Seitz | 348/188 |
| 2005/0099502 A1 * | 5/2005 | Kang | 348/207.99 |

FOREIGN PATENT DOCUMENTS

| | | |
|---|---|---|
| EP | 0 964 223 A1 | 12/1999 |
| JP | 8-86613 A | 4/1996 |
| JP | 8-086613 A | 4/1996 |
| JP | 10-320558 A | 12/1998 |
| JP | 11-101640 A | 4/1999 |
| JP | 11-271053 A | 10/1999 |
| JP | 11-351865 A | 12/1999 |
| JP | 2002-027507 A | 1/2002 |

OTHER PUBLICATIONS

R.G. Willson, "Modeling and Calibration of Automated Zoom Lenses", Ph.D Dissertation, The Robotics Istitute, Carnegie, Mellon University, Jan. 1994, pp. 1-171.

J. Cardillo et al., "3-D Position Sensing Using a Passive Monocular Vision System", IEEE Transactions on Pattern Analysis and Machine Intelligence, vol. 13, No. 8, Aug. 1, 1991, pp. 809-813.

K. Tarabanis et al., "Modeling of a Computer-Controlled Zoom Lens", Proceedings of the International Conference on Robotics and Automation, IEEE Comp. Soc. Press, vol. 3, Conf. 3, May 12-14, 1992, pp. 1545-1551.

Shen-Wen Shih et al., "Calibration of an Active Binocular Head", IEEE Transactions on Systems, Man and Cybernetics—Part A: Systems and Humans, vol. 28, No. 4, Jul. 1, 1998, pp. 426-442.

R. Hartley, "Self-Calibration from Multiple Views with a Rotating Camera", Proceedings of Third European Conference on Computer Vision, vol. 1, 1994, pp. 471-478.

R. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.

R. Enciso et al., "Experimental Self-Calibration from Four Views", Proceedings of 8th International Conference on Image Analysis and Processing, Sep. 1995, pp. 307-312.

A. Wiley et al., "Metric Aspects of Zoom Vision", Close-Range Photogrammetry Meets Machinery Vision, SPIE, vol. 1395, 1990, pp. 112-118.

\* cited by examiner

First mark

Second mark

· · · · · · · · ·

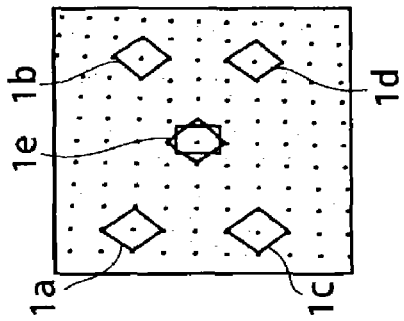
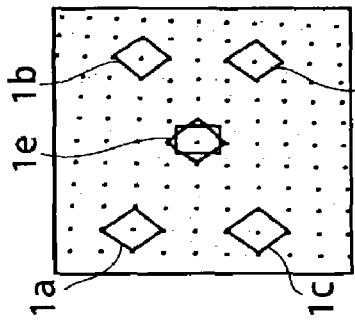
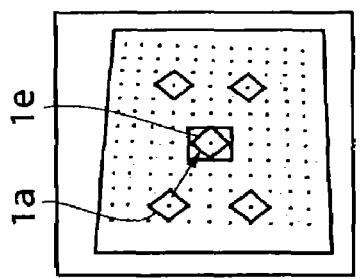
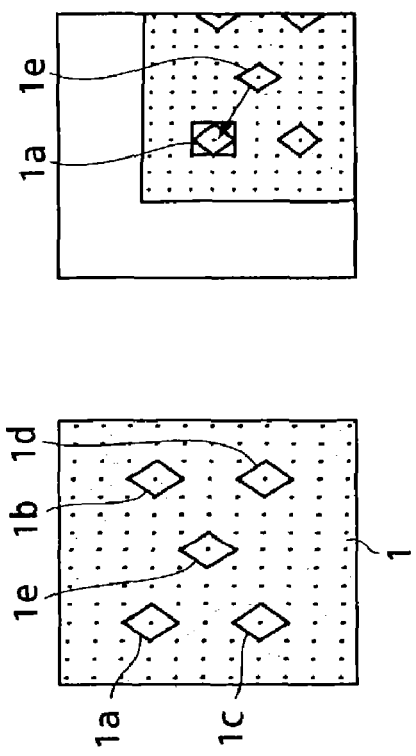
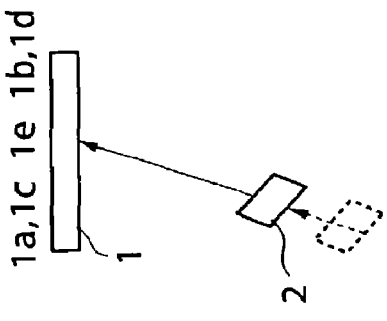
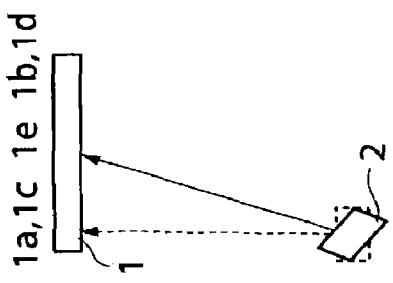
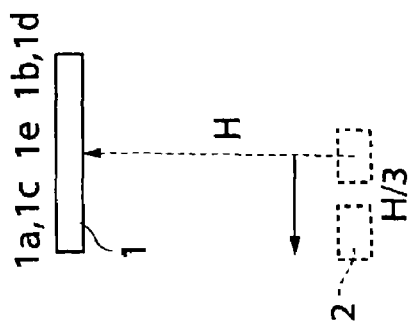
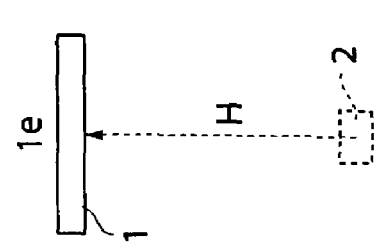

FIG.19

Photographing and analyzing conditions (unit: mm)

| | Focal length (approximate value) | Object distance H | Photographing baseline length B |
|---|---|---|---|
| Case 1: Relatively wide | 9 | 2586 | 774 |
| Case 2: Intermediate | 30 | 6494 | 1904 |
| Case 3: Relatively telephoto | 42 | 7516 | 1706 |

FIG.20

Results of Experiment for Measurement Accuracy

| Pattern Focal length | Focal length (analysis value) [mm] | Vertical parallax at mutual localization [μm] | Plane accuracy [mm] | Depth accuracy [mm] | $\sigma_{XY}$ [mm] | $\sigma_{Z}$ [mm] |
|---|---|---|---|---|---|---|
| Case 1: Relatively wide (Without correction) | 8.83 | 1.5 (8.8) | 0.7 (8.4) | 1.4 (13.5) | 1.0 | 3.3 |
| Case 2: Intermediate, approx. (Without correction) | 30.04 | 0.8 (6.7) | 1.3 (9.6) | 1.8 (15.2) | 0.7 | 2.5 |
| Case 3: Relatively telephoto (Without correction) | 43.21 | 1.5 (6.8) | 1.4 (11.3) | 1.9 (18.8) | 0.6 | 2.6 |

DEVICE AND METHOD OF MEASURING DATA FOR CALIBRATION, PROGRAM FOR MEASURING DATA FOR CALIBRATION, PROGRAM RECORDING MEDIUM READABLE WITH COMPUTER, AND IMAGE DATA PROCESSING DEVICE

BACKGROUND OF THE INVENTION

1. Field of the Invention

The present invention relate to a device and a method for measuring data for calibration used when a lens aberration in a photographed image is corrected or when a lens aberration-corrected image for use in stereo image measurement or the like is necessary and, more particularly, to a device and a method for measuring data for calibration with which the internal parameters of a camera, such as the principal point position of the lens, screen distance (focal length) and distortion parameters, necessary to obtain a lens aberration corrected-image can be obtained with ease even if the camera is of the type in which optical conditions can be varied (a zoom camera, for example).

The present invention also relates to an image processing device capable of removing the effect of lens aberration in a stereo image photographed with a camera of the type in which optical conditions can be varied (a zoom camera, for example) to allow precise three-dimensional measurement of the shape of an object by stereo image measurement.

2. Description of the Related Art

Conventionally, it is important to obtain an image with low aberration in the fields of photogrammetry and photographic measurement. In the fields of photogrammetry and photographic measurement, high-accuracy lenses with a low aberration are therefore used. In the field of photogrammetry, the internal parameters of a camera (principal point position, screen distance, and distortion parameters) are analytically obtained in a way that a multiplicity of points measured precisely are positioned in a three-dimensional space and then measured from various angles. In the case of a measuring camera for use in the field of photographic measurement, the internal parameters of a camera are obtained by measuring precisely a fabricated camera.

However, an image photographed with a commercially available digital camera cannot be used in stereo image measurement of an object without correction because the lens distortion is large. Thus, it is necessary to correct the image using the internal parameters of the digital camera (principal point position, screen distance and lens distortion) and to measure the focal length of the digital camera at which the image was taken precisely to enhance the three-dimensional precision. Description will be hereinafter made of a fixed focus camera and a multi-focus camera separately.

Conventionally, camera calibration is performed on a fixed focus stereo camera and a photograph of an object for stereo image measurement is taken at its fixed focal point. However, a fixed focus stereo camera cannot adjust the focal length depending upon the objects, so that the image may be out of focus or the photographed object may not be large enough to fill the image area under some photographing conditions. Thus, it is difficult to obtain a stereo image of quality sufficient to be used in stereo image measurement. In addition, when the camera or the lens is changed depending upon the size of the object or the necessary precision to select a camera or a lens with a proper focal length, calibration must be performed again on the selected camera. Thus, three-dimensional measurement cannot be easily performed with a fixed focus stereo camera, which prevents spreading of stereo image measurement.

In a multi-focus digital camera employing a so-called zoom lens, the lens distortion is large, and the depth accuracy and the lens distortion vary with the focal length. Thus, when the focal length is changed, calibration must be performed again. It is, therefore, difficult to carry out image measurement using a zoom lens from the viewpoint of work efficiency. Thus, even a multi-focus camera is used as a fixed focus camera without using the function of the zoom lens, which makes stereo image measurement on site inconvenient.

SUMMARY OF THE INVENTION

The present invention has been made to solve the above problems, and a first object of the present invention is to provide a device and a method for measuring data for calibration with which the internal parameters of a camera necessary to obtain a high quality image free from the effect of lens distortion can be obtained with ease even if the camera is of the type in which optical conditions can be varied (a zoom camera, for example).

A second object of the present invention is to provide an image processing device capable of removing the effect of lens aberration in a stereo image photographed with a camera of the type in which optical conditions can be varied (a zoom camera, for example) to allow precise three-dimensional measurement of the shape of an object in stereo image measurement.

The inventive device for measuring data for calibration, which achieves the first object, is for a purpose of obtaining data for calibration of a camera 2 capable of varying its optical conditions, using a plurality of the images of a calibration chart 1 having marks arranged thereon which were photographed with the camera 2 under varied optical conditions, and comprises, as shown in FIG. 1, a mark extracting part (131, 132, 133) for extracting the marks from the images of the chart; an internal parameter calculating part 134 for calculating data for calibration under the optical conditions under which the images of the chart were photographed based on the positions of the marks extracted by the mark extracting part and a plurality of conditions under which the images of the chart were photographed; and an internal parameter function calculating part 160 for calculating data for calibration corresponding to the varied optical conditions in the camera 2 in photographing using the data for calibration calculated in the internal parameter calculating part 134 and a plurality of optical conditions under which the images of the chart were photographed.

A camera capable of varying its optical conditions herein is a camera with a zoom lens in which the focal length can be changed or an auto-focus camera in which the lens can be adjusted to adjust the focus. The images of a chart photographed under varied optical conditions are images of a chart photographed at various focal lengths or at various lens positions using an auto-focus mechanism of a camera. The varied optical conditions in the camera in photographing are the individual focal lengths adjusted with a zoom lens or the like. The images of the chart are photographed at the focal length. The data for calibration include at least either of data of the principal point of a lens or data of the distortion aberration of the lens.

In the device constituted as above, the mark extracting part extracts the marks from the images of the chart and, preferably, can extract the positions of the marks. The internal parameter calculating part 134 calculates data for calibration under the optical conditions under which the images of the chart were photographed based on the positions of the marks extracted by the mark extracting part and, preferably, uses a group of images of the chart photographed under the same optical condition as the base of the calculation. The internal parameter function calculating part 160 calculates data for calibration corresponding to the varied optical conditions of the camera 2 in photographing using the data for calibration for each of the optical photographing conditions calculated in the internal parameter calculating part 134 and a plurality of optical conditions under which the images of the chart were photographed. Preferably, the internal parameter calculating part 160 has mathematical expressions for obtaining function forms of coefficients constituting the internal parameter functions and for calculating the internal parameters using coefficients corresponding to the varied optical photographing conditions of the camera 2.

Preferably, the chart for calibration is flat as shown in FIG. 1, and the plurality of the images of the chart are stereo images photographed in such a manner that data for calibration can be calculated therefrom by the mark extracting part (131, 132, 133) and the internal parameter calculating part 134 as shown in FIG. 5 to FIG. 7.

Preferably, the chart for calibration is three-dimensional (three-dimensional reference chart 20) as shown in FIG. 14, and the plurality of images of the chart are stereo images photographed in such a manner that data for calibration can be calculated therefrom by a mark extracting parts 171 and an internal parameter calculating part 173.

Preferably, the data for calibration calculated in the internal parameter calculating part 160 can be continuously calculated according to the varied optical photographing conditions of the camera as shown in FIG. 13.

The method for measuring data for calibration of the present invention, which achieves the first object, comprises: a step of photographing a plurality of images of a calibration chart having marks arranged thereon, with a camera capable of varying its optical conditions under varied optical conditions (S102, S104); a mark extracting step for extracting the marks from the images of the chart (S105); an internal parameter calculating step for calculating data for calibration under which the images of the chart were photographed based on the positions of the extracted marks (S106); and an internal parameter function calculating step for calculating data for calibration corresponding to the varied optical conditions in the camera in photographing using the calculated data for calibration and a plurality of optical conditions under which the images of the chart were photographed (S110) as shown in FIG. 8.

The program for measuring data for calibration of the present invention, which achieves the first object, is a program used to obtain data for calibration of a camera capable of varying its optical conditions, wherein the data for calibration are obtained using a plurality of images of a calibration having marks arranged thereon which were photographed with the camera under varied optical conditions, and is for making a computer function as; mark extracting means (131, 132, 133) for extracting the marks from the images of the chart; internal parameter calculating means 134 for calculating data for calibration under optical conditions under which the images of the chart were photographed based on the positions of the marks extracted by the mark extracting means; and internal parameter function calculating means 160 for calculating data for calibration corresponding to the varied optical photographing conditions of the camera using the data for calibration calculated in the internal parameter calculating means 134 and a plurality of optical conditions under which the images of the chart were photographed. The program for measuring data for calibration is stored in the computer readable recording medium of the present invention.

The image data processing device of the present invention, which achieves the second object, comprises an image data receiving parts (210, 220) for receiving data of photographed images and optical photographing conditions from a camera 2 capable of varying the optical conditions; a calibration data forming part 230 for forming data for calibration based on the optical photographing conditions received by the image data receiving part; and an image processing part 240 for processing the data of photographed images based on the data for calibration as shown in FIG. 15.

In the device constituted as above, the image data receiving part (210, 220) receives data of photographed images and optical photographing conditions from a camera 2 capable of varying the optical conditions. The calibration data forming part 230 forms data for calibration based on the optical photographing conditions received by the image data receiving part. By the data for calibration, the effect of the lens aberration of the camera 2 included in the data of photographed images can be compensated. Since the image processing part 240 processes the data of photographed images based on the data for calibration, precise image data free from the effect of lens aberration can be obtained. The image data allows precise three-dimensional measurement even when used in measurement of height and depth of the peaks and bottoms on a surface based on minute parallax differences on an image as stereo image measurement.

The optical photographing conditions may be directly received from the camera 2 as the photograph data receiving part 220 does, or may be obtained indirectly from the data of photographed images as the focal length calculating part 232 does. When the focal length calculating part 232 calculates the optical photographing conditions, the calibration data forming part 230 receives the optical photographing conditions from the focal length calculating part 232.

This application is based on Japanese patent application, No. 2002-195058 filed in Japan on Jul. 3, 2002, which is entirely incorporated herein by reference.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BRIEF DESCRIPTION OF THE DRAWINGS

FIGS. 6(A)-6(H) are views, illustrating the procedure of photographing a chart with a zoom-camera and showing camera images and the positional relations between the chart and the camera corresponding to the camera images;

FIG. 19 is a view, illustrating photographing conditions of a camera; and

FIG. 20 is a view, showing the results of experiment for measuring the accuracy of stereo image measurement.

DESCRIPTION OF THE PREFERRED EMBODIMENTS

Figure 1:
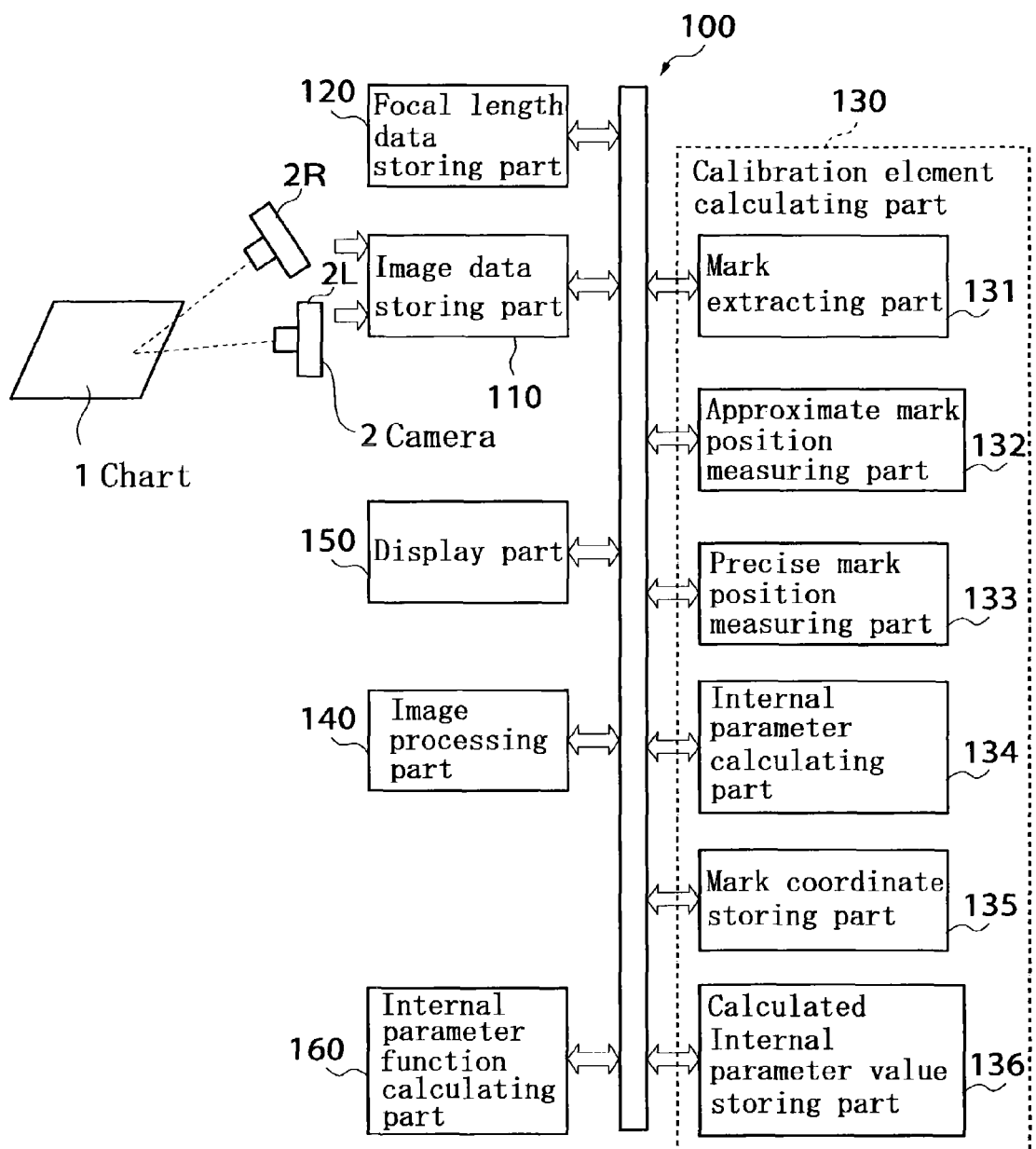
FIG. 1 is a block diagram, showing a device for measuring data for calibration according to a first embodiment of the present invention.

Description will be hereinafter made of the present invention with reference to the drawings. FIG. 1 is a block diagram illustrating a device for measuring data for calibration according to a first embodiment of the present invention. In FIG. 1, designated as 1 is a chart for calibration. The chart 1 is a flat sheet on which first and second marks has been printed. The chart 1 may be a flat screen of a device such as a notebook computer displaying an image of a flat sheet on which first and second marks are printed. A screen of glass, such as a screen of a liquid crystal display, is suitable for a device for displaying the chart 1 since its surface expands and contracts with changes in moisture and temperature much less than that of a paper sheet.

The first marks are used for measurement of approximate mark positions and correlating a pair of images for calibration and used to determine the angles at which a camera 2 photographed the chart 1. At least three first marks are provided on the chart 1. Preferably, four first marks are provided on the chart 1, one in each quadrant. The second mark designates the position of image data of the chart 1 photographed with the camera 2 and is also referred to as target. Preferably, the second marks are provided all over the chart 1 at a uniform density. At least thirty, preferably 100 to 200, second marks are provided on the chart 1. The chart 1 will be described later in detail.

The camera 2 is a variable focal length camera, for example, as an object of calibration. The camera 2 can be functioned as a wide-angle lens camera when the focal length is shortened (to 8 mm, for example) or as a telephoto lens camera when its focal length is extended (to 200 mm, for example). The focal length of the camera 2 can be also set to a value equivalent to that of a standard lens (35 mm). The camera 2 preferably has an auto-focus function, and the lens can be moved to adjust the focus. Typically, the camera 2 has a lens with large aberration as in the case with an optical camera or a digital camera for a general purpose as compared with a camera for photogrammetry and photographic measurement. The camera 2 is used to photograph an object or the chart 1, and, typically, used to photograph the object or the chart 1 in stereo at a pair of right and left photographing positions 2R and 2L. Data of a pair of images photographed at the right and left photographing positions 2R and 2L are useful for three-dimensional image measurement of an object.

A calibration data measuring part 100 has an image data storing part 110, a focal length data storing part 120, a calibration element calculating part 130, an image processing part 140, a display part 150, and an internal parameter function calculating part 160. The image data storing part 110 is a recording device for storing image data of the chart 1 photographed with the camera 2 and may be an electromagnetic recording medium such as a magnetic disc or a CD-ROM. The image data to be stored in the image data storing part 110 are preferably stereo image data photographed with the camera 2 in such a manner that the chart 1 can be viewed in stereo. Typically, the data are images photographed at the right and left photographing positions 2R and 2L. Preferably, images are stored in the image data storing part 110 in such a state that the angles at which the images were photographed can be determined. The calibration data measuring part 100 is provided with an I/O device for reading the image data in the image data storing part 100.

The focal length data storing part 120 stores the focal lengths of the camera 2 at which the images stored in the image data storing part 110 were photographed. The focal lengths may be focal length information which is attached to the image data of the chart 1 photographed with the camera 2, focal length data taken out of the camera 2, or focal lengths calculated from the image data at the time of measurement. When the internal parameters of the camera are obtained in the calibration element calculating part 130, a polynomial for approximating to a function is selected in the internal parameter calculating part 160 so that they can match the number of measuring points at which the focal length data are measured and the intervals thereof. For example, when the focal length of the zoom camera 2 can be adjusted from 7.2 mm to 50.8 mm and when the number of the measuring points is six, the measurement is performed at equal intervals in an optical sense, for example, at focal lengths of 7.2 mm, 8.7 mm, 11.6 mm, 24.8 mm, 39.0 mm and 52.2 mm. The focal length of 7.2 mm to 50.8 mm of the zoom camera 2 equivalent to 28 mm to 200 mm in 35 mm format.

The calibration element calculating part 130 has a mark extracting part 131, an approximate mark position measuring part 132, a precise mark position measuring part 133, an internal parameter calculating part 134, a mark coordinate storing part 135, and a calculated internal parameter value storing part 136. The calibration element calculating part 130 has an image processing part 140 to confirm the internal parameters calculated in the internal parameter calculating part 134, and has an image data storing part 110 and a display part 150 as external devices. As the calibration element calculating part 130 and the image processing part 140, computers mounting a Pentium (trademark) or Celeron (trademark) produced by Intel Corporation as a CPU may be used.

The mark extracting part 131 perform a first mark extracting process to extract the first marks from the image data stored in the image data storing part 110 and obtain the image coordinate values of the first marks. The first mark extracting process as a pre-process prior to calculating and correlating the approximate positions of the second marks is performed by The approximate mark position measuring part 132. The image coordinate values of the first marks are stored in the mark coordinate storing part 135. When the first mark includes a mark which is the same as the second mark, the positions of the second marks in the first marks can be used as the image coordinate values of the first marks. The process of extracting the first marks by the mark extracting part 131 will be described late in detail.

The approximate mark position measuring part 132 performs projection conversion to obtain exterior orientation element from the image coordinate values of the first marks, and calculates the approximate positions of the second marks using the single-photograph orientation theorem and a collinearity condition expression to correlate a pair of images for calibration. The process of calculating the approximate positions of the second marks by the approximate mark position measuring part 132 will be described later in detail.

The precise mark position measuring part 133 recognizes the second marks on the paired images for calibration and calculates the positions of the second marks precisely. The internal parameter calculating part 134 extracts a second mark suitable for calibration from the second marks the precise positions of which has been calculated in the precise mark position measuring part 133 and adjusts the exterior orientation elements and the objective coordinates thereof simultaneously, and calculates the internal parameters of the camera 2 as data for calibration. The calculated internal parameter value storing part 136 stores the internal parameters of the camera 2 calculated in the internal parameter calculating part 134. When there are second marks whose positions calculated by the precise mark position measuring part 133 are significantly contradicts the positions of other second marks in the image data of the chart 1, the internal parameter calculating part 134 removes the positions of such second marks. The internal parameters of the camera 2 calculated in the internal parameter calculating part 134 are preferably stored in the internal parameter calculating part 136 together with the focal length of the camera 2 at which the chart 1 was photographed.

The internal parameters of a camera are the principle point position, the screen distance and the distortion parameters. Although only distortion parameters are herein obtained, the spherical aberration, coma, astigmatism and curvature of field comprising Seidel's five aberrations may be obtained. The internal parameters obtained in the internal parameter calculating part 134 are displayed on the display part in graphical form. The process of obtaining the internal parameters of the camera by the internal parameter calculating part 134 as well as the precise mark measuring part 133 will be described later in detail.

The image processing part 140 rearranges the data of an image photographed with the camera 2 (especially, an image of other than the chart 1) using the internal parameters calculated in the internal parameter calculating part 134. Then, the image photographed with the camera 2 is displayed on the display part 150 as a low distortion image almost free from lens aberration. The display part 150 is an image display device such as a CRT or a liquid crystal display. The mark coordinate storing part 135 stores the image coordinate values of the first marks and the management numbers and the image coordinate values of the second marks.

The internal parameter function calculating part 160 calculates internal parameter functions using the data for calibration calculated in the internal parameter calculating part 134 and the focal lengths of the camera 2 at which the images of the chart 1 targeted by the calibration element calculating part 130 were photographed. The process of calculating data for calibration (internal parameter functions) corresponding to the focal lengths of the camera 2 by the internal parameter function calculating part 160 will be described later in detail.

Description will be next made of the chart 1 as a chart for calibration. Although description will be herein made taking a paper or plastic sheet on which prescribed marks are printed, the chart 1 may be a flat screen on which an image of the prescribed marks is displayed.

Figure 2:
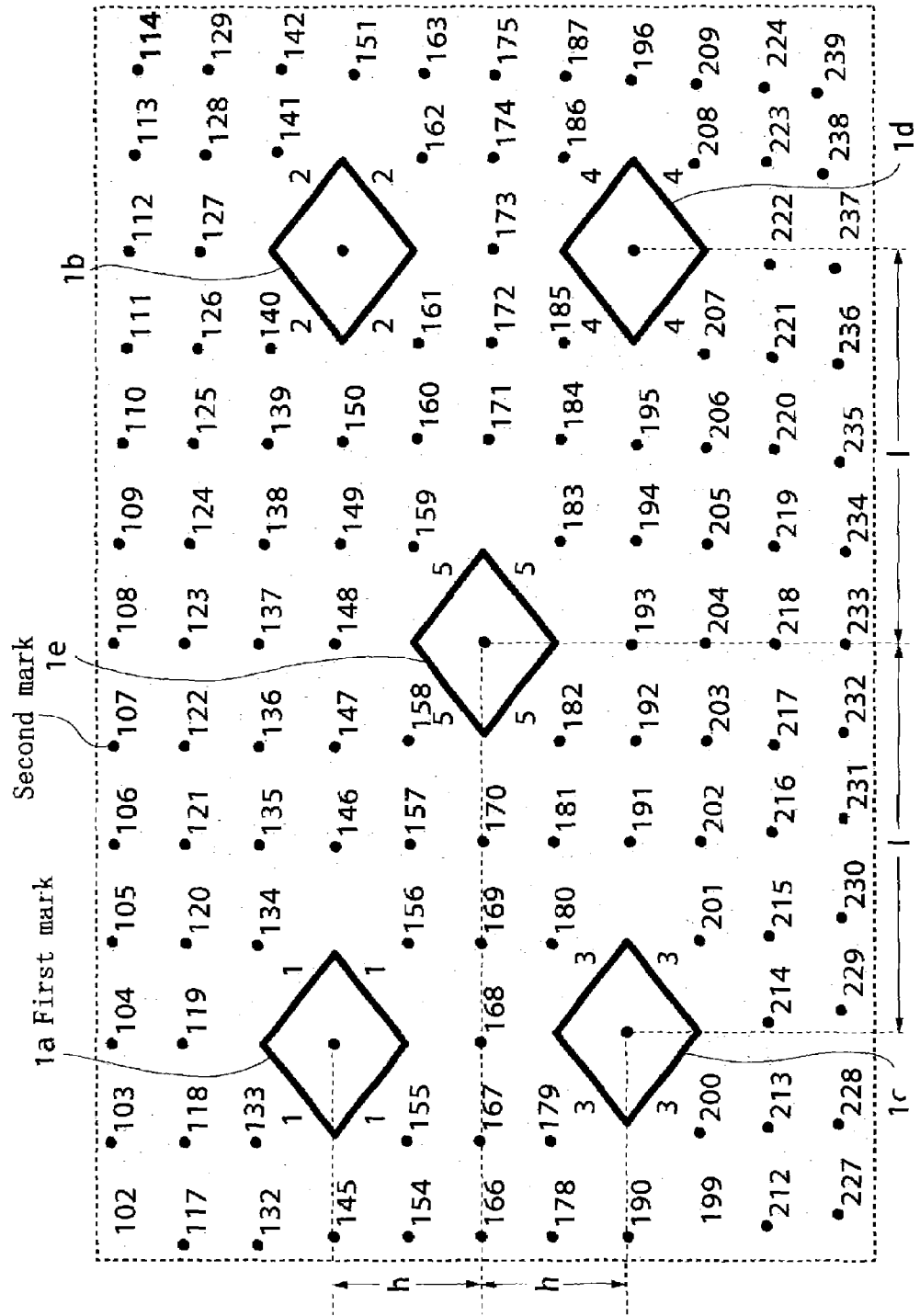
FIG. 2 is a plan view, showing an example of a calibration chart.

FIG. 2 is a plan view, illustrating an example of a chart for calibration. The chart 1 is a flat sheet having first marks easy to see and a plurality of dots as the second marks printed thereon. Five first marks are provided on the chart 1. Each of the first marks is a rhombus with a mark which is the same as the second mark at the center. When the chart 1 is divided into four quadrants, each of the quadrants has one first mark. Namely, first marks 1a, 1b, 1c and 1d are located in the top left quadrant, top right quadrant, bottom left quadrant, and bottom right quadrant, respectively. A first mark 1e is located at the point of origin. For example, the first marks 1a, 1b, 1c and 1d are located at the same distance "d" from the first mark 1e. Supposing "h" and "l" be the vertical distance from the first marks 1a or 1b to the first mark 1e, and the lateral distance from the first marks 1c or 1d to the first mark 1e, respectively, the distance "d" from the first mark 1e to the first mark 1a, 1b, 1c, or 1d satisfies the following relation:

$$d=(h^2+l^2)^{1/2} \quad (1)$$

The first and second marks are printed in the desired size or the size of the first and second marks are measured in advance. The values expressing the positions where the first and second marks are printed are read in the mark coordinate storing part 135 of the calibration device and used in calculating and correlating the approximate position of the second marks in the approximate mark position measuring part 132. The chart 1 may be stored in the memory of the computer as image data and printed before use at the calibration site. When the positions of the first and second marks are stored in the calibration device in advance and printed in the positions on a sheet, the work can be facilitated because no measurement is necessary. Alternatively, the coordinate positions of the first and second marks on the chart 1 may be measured precisely and stored in the mark coordinate storing part 135 in advance.

The first marks are used in calculating and correlating the approximate positions of the second marks and also used as targets to determine the photographing directions. Also, when the first marks have a mark which is same as the second mark in each center, the first marks can be used as templates in precise measurement of the second marks by the precise mark position measuring part 133.

Figure 3A:
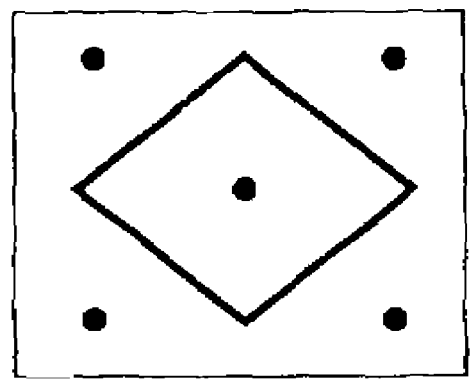
FIGS. 3(A)-3(C) are explanatory views, illustrating examples of a first mark.
Figure 3B:
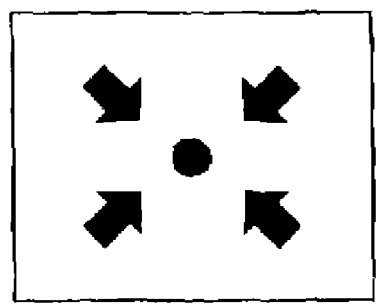
Figure 3C:
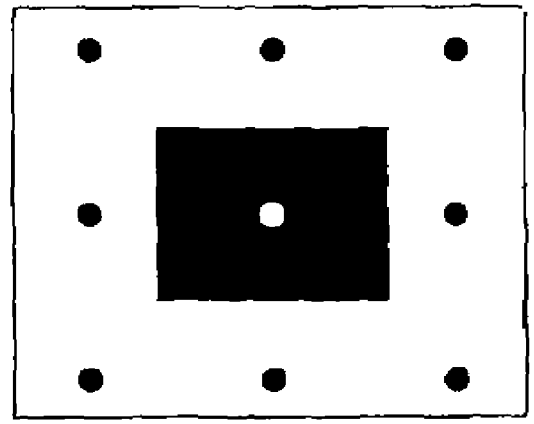
Figure 4A:
FIGS. 4(A)-4(H) are explanatory views, illustrating examples of a second mark.
Figure 4B:
Figure 4C:
Figure 4D:
Figure 4E:
Figure 4F:
Figure 4G:
Figure 4H:

FIG. 3 is an explanatory view, illustrating examples of the first mark, in which (A) is a mark constituted of a rhombic, (B) is a mark constituted of four arrows and (C) is a mark constituted of a black rectangle. In the marks (A) and (B), a mark which is the same as the second mark is circumscribed by a rhombic and four arrows, respectively so as to be easily recognized by the operator. By using such marks easy to recognize as the first marks, the first marks can be easily extracted and thus can be easily found even when one angle is selected as a photographing angle of the camera from a wide range of photographing angle. In the mark (C) in FIG. 3, the first mark is a black rectangle and the mark in the center is inverted in color from the second marks. This is also easy to detect. When the tone of the mark (C) is inverted, it can be used as a template of a second mark in measurement of second marks by the precise mark measuring part 133.

FIG. 4 is an explanatory view, illustrating examples of the second mark, in which (A) is a black circle, (B) is a plus sign, (C) is a double circle, (D) is a letter X, (E) is a star, (F) is a black square, (G) is a black rectangle, and (H) is a black rhombic. Since a multiplicity of the second marks are arranged all over the chart 1, various types of mark can be employed as the second mark as long as its precise position can be easily measured.

Figure 5:
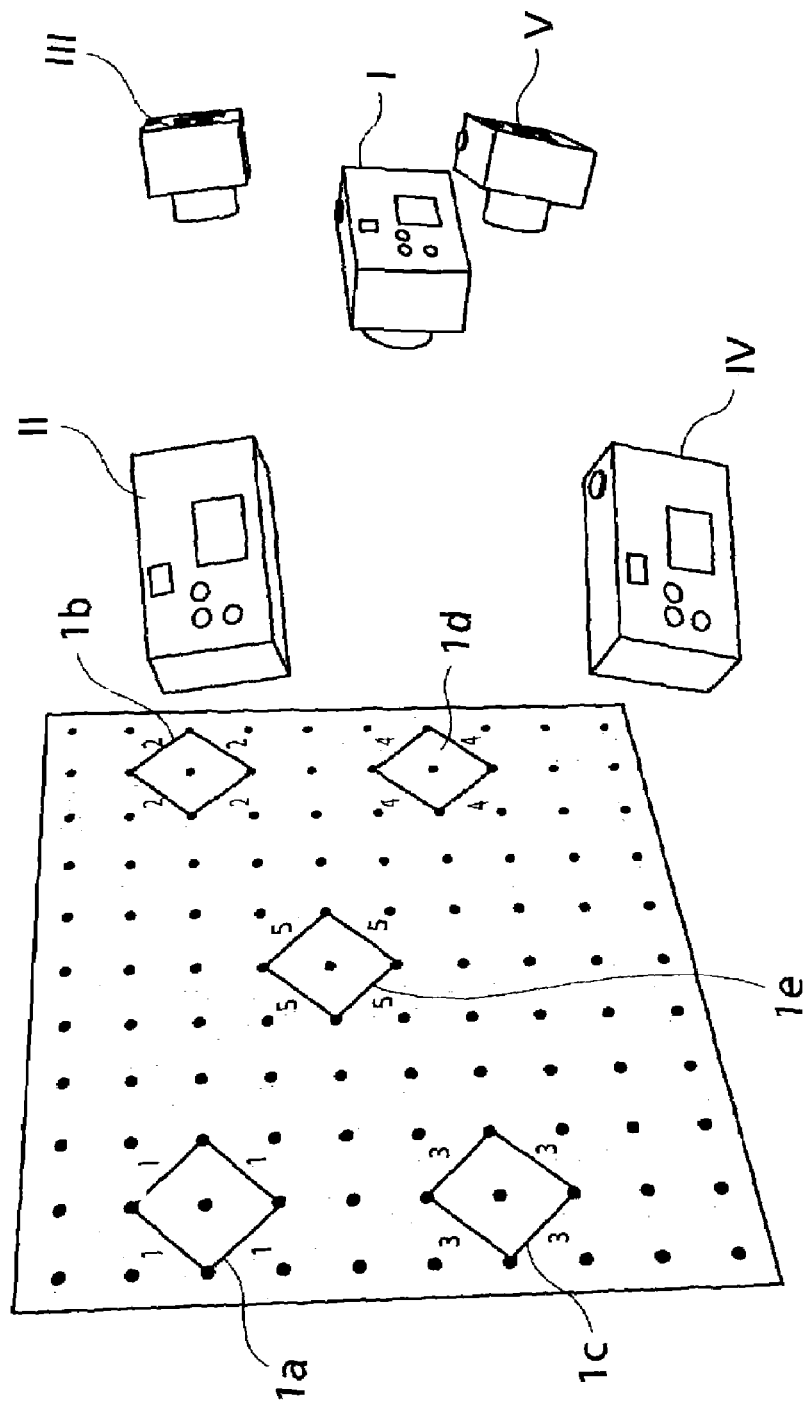
FIG. 5 is a perspective view, showing the positions of a zoom camera in measuring the lens aberration at various focal lengths of the camera.

Description will be made of the procedure for photographing the chart 1 with a camera 2 as an object of calibration. FIG. 5 is a perspective view illustrating the positions of a zoom camera in measuring the lens aberration at various focal lengths of the camera. Calibration can be performed when there are at least two images of the chart 1 photographed from different angles. When a flat chart printed on a sheet is used as the chart 1, the chart 1 is preferably photographed from at least three angles. Thereby, stable and reliable measurement of calibration elements, focal length, in particular, can be performed. FIG. 5 shows the procedure for photographing the chart 1 from the front (I), upper left side (II), upper right side (III), lower left side (IV) and lower right side (V). The incident angle of the optical axis of the camera 2 with respect to the flat chart is preferably in the range of 10 to 30 degrees when the depth accuracy on site is set to about 1 cm. In view of the fact that the distance range in which the camera can be focused is limited because of the focal depth of the lens, the incident angle is preferably in the range of 12 to 20 degrees. Typically, the incident angle is 15 degrees. The "various focal lengths" means the focal lengths equivalent to those of normal lens, wide-angle lens and telescopic lens in a single lens reflex camera.

Description will be made of the procedure for photographing the chart 1 with a zoom camera with reference to FIG. 6. In FIGS. 6(A), 6(B), 6(C) and 6(D) are images photographed with the camera and 6(E), 6(F), 6(G) and 6(H) show the positional relations between the chart 1 and the camera 2 corresponding to the images. The following (I) to (V) in correspond to the camera positions in FIG. 5.

(I): An image is photographed such that the image area is filled with all the first and second marks (FIGS. 6(A), 6(E)). At this time, the marks in the peripheral areas are preferably positioned as close to the edges of the image area as possible. Thereby, the distortion in the peripheral areas, as well as in the central area, of the lens can be reliably corrected. Thus, the object distance H is changed according to the focal length of the camera.

(II): When the focal length of the zoom camera is equivalent to that of a telephoto lens or a normal lens, the camera is moved to a position at a distance about ⅓ the object distance H from the front position so that the first mark 1a, for example, in the upper left quadrant of the chart 1 is located at the center of the image area (FIGS. 6(B), 6(F)). When the focal length of a zoom camera is equivalent to that of a wide-angle lens and the when the object distance H is within 1 m, the camera 2 is moved so that the target first mark is located in front of it. Then, the camera 2 is turned so that the first mark 1e at the center of the chart 1 comes to the center of the image area with its position maintained (FIGS. 6(C), 6(G)). The camera 2 is then moved closer to the chart 1 so that the first and second marks fill the image area, and the image is photographed (FIGS. 6(D), 6(H)).

(III): The camera is moved so that the first mark 1b in the top right quadrant of the chart 1 comes to the center of the image area. Then, the camera is turned so that the first mark 1e at the center of the chart 1 comes to the center of the image area. The camera 2 is then moved closer to the chart 1 so that the first and second marks fill the image area, and the image is photographed.

(IV): The camera is moved so that the first mark 1c in the bottom left quadrant of the chart 1 comes to the center of the image area. Then, the camera is turned so that the first mark 1e at the center of the chart 1 comes to the center of the image area. The camera 2 is then moved closer to the chart 1 so that the first and second marks fill the image area, and the image is photographed.

(V): The camera is moved so that the first mark 1d in the bottom right quadrant of the chart 1 comes to the center of the image area. Then, the camera is turned so that the first mark 1e at the center of the chart 1 comes to the center of the image area. The camera 2 is then moved closer to the chart 1 so that the first and second marks fill the image area, and the image is photographed.

Through the above procedure, the angle of the camera 2 can be obtained as the difference in the photographing angle, the focal lengths can be reliably measured.

Description will be made of the advantage of the photographing procedure utilizing the first marks at the time when a sheet on which the first and second marks are printed or a flat screen on which the first and second marks are displayed is used as a chart 1. When marks printed on a flat sheet are photographed, a camera cannot be inclined at a desired angle and, thus, the screen distance (focal length) cannot be obtained precisely. Namely, since the chart has no change in the focal length direction (height direction or depth direction), there is nothing to constrain the calculated values of the internal parameters. Thus, when the internal parameters of the camera are calculated, the values are not reliable. Thus, three-dimensionally arranged targets are measured to obtain the focal length. However, three-dimensionally arranged targets are difficult to measure and the measurement cannot be automated. Also, three-dimensionally arranged targets are difficult to produce.

The flat chart 1 is, however, a flat sheet on which the first and second marks are printed or a screen on which the first and second marks are displayed, so that the difficulty of correlating the targets in using three-dimensionally arranged targets can be solved. Also, when photographing is performed using the first marks, the camera 2 can be inclined at a desired angle. Thereby, the change in the height (depth) direction is produced, and the focal length can be calculated precisely. For example, when the camera 2 can be inclined by 10 degrees or more, the focal length can be reliably obtained with the calibration device of the present invention.

The distance H between the camera 2 and the chart 1 is obtained from the focal length f of a zoom camera. For example, when the focal length of a zoom camera is equivalent to that of a normal lens of a 35 mm camera, the object distance H is about 90 cm. The distance "d" between the first marks on the chart 1 is 20 cm, for example. Thus, when the photographing direction is inclined from the front position (I)

to the upper left position (II) and so on, a photographing angle of about 10 degrees can be secured.

The upper limit of the inclination angle of the photographing direction is determined by the focal depth and so on. Namely, when the inclination angle of the photographing direction is large, the distances between the camera 2 and the first marks vary depending upon the first marks and of the first marks in the image are blurred. Thus, the upper limit of the inclination angle of the photographing direction is 30 degrees, for example. In reality, when the chart 1 is photographed such that the first and second marks fill the image area according to the steps (I) to (V), the above condition is automatically met. Thus, the conditions on the object distance and the photographing position are satisfied.

Figure 7:
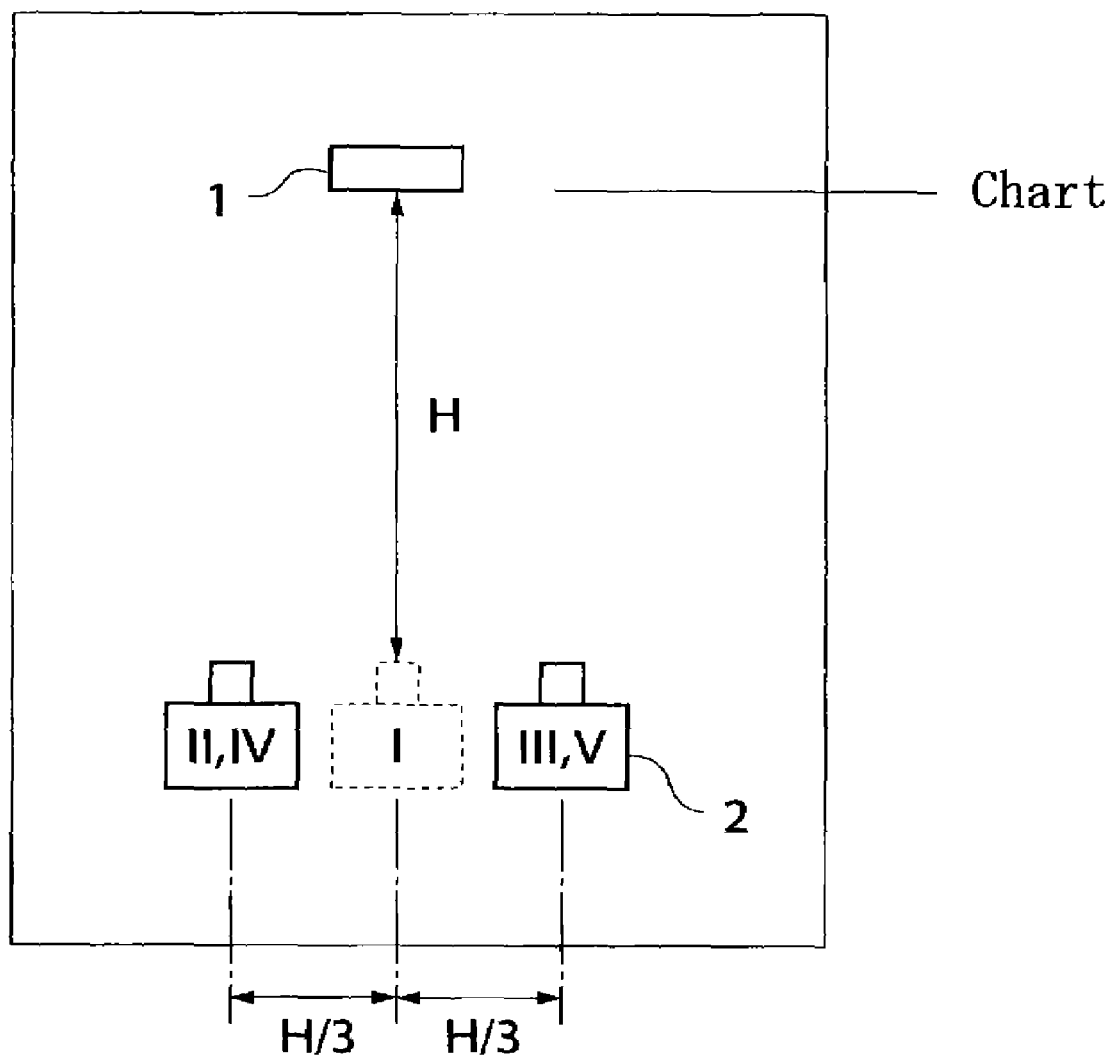
FIG. 7 is a view, illustrating a camera distance in measuring the lens aberration when the focal length of a zoom camera is equivalent to that of a normal lens or a telephoto lens.

FIG. 7 is a view illustrating a camera distance in measuring the lens aberration when the focal length of a zoom camera is equivalent to that of a normal lens or a telephoto lens. When the focal length of a zoom camera is equivalent to that of a normal lens or a telephoto lens, the viewing angle to the photographing lens is narrow and the camera cannot be inclined very largely. Thus, when the photographing angle is inclined from the front position (I) to the top left position (II) and so on, a photographing angle of 10 degrees cannot be secured. This is because the distance H between the camera 2 and the chart 1 is 1 m or longer and the distance "d" between the first marks is about 20 cm when the focal length is long. Thus, the camera positions (II) and (IV) on the left side and the camera positions (III) and (V) on the right side are determined with respect to the front position (I). At this time, the camera is shifted by a distance of about one-third the object distance H from the front position (I). Then, photographing at the top left position (II), bottom left position (IV), top right position (III) and bottom right position (V) are performed. The optical axis of the camera is aligned with the normal line of the chart 1 or may be directed toward the chart 1.

In the above embodiment, description has been made of an example in which the chart 1 is photographed from five different positions: front (I), top left (II), top right (III), bottom left (IV) and bottom right (V). However, it is only necessary that the chart 1 is photographed from two different positions: right and left. Alternatively, the chart 1 may be photographed from three different positions. When the chart 1 is photographed from two different angles, a photographing angle of about 10 degrees must be secured.

Figure 8:
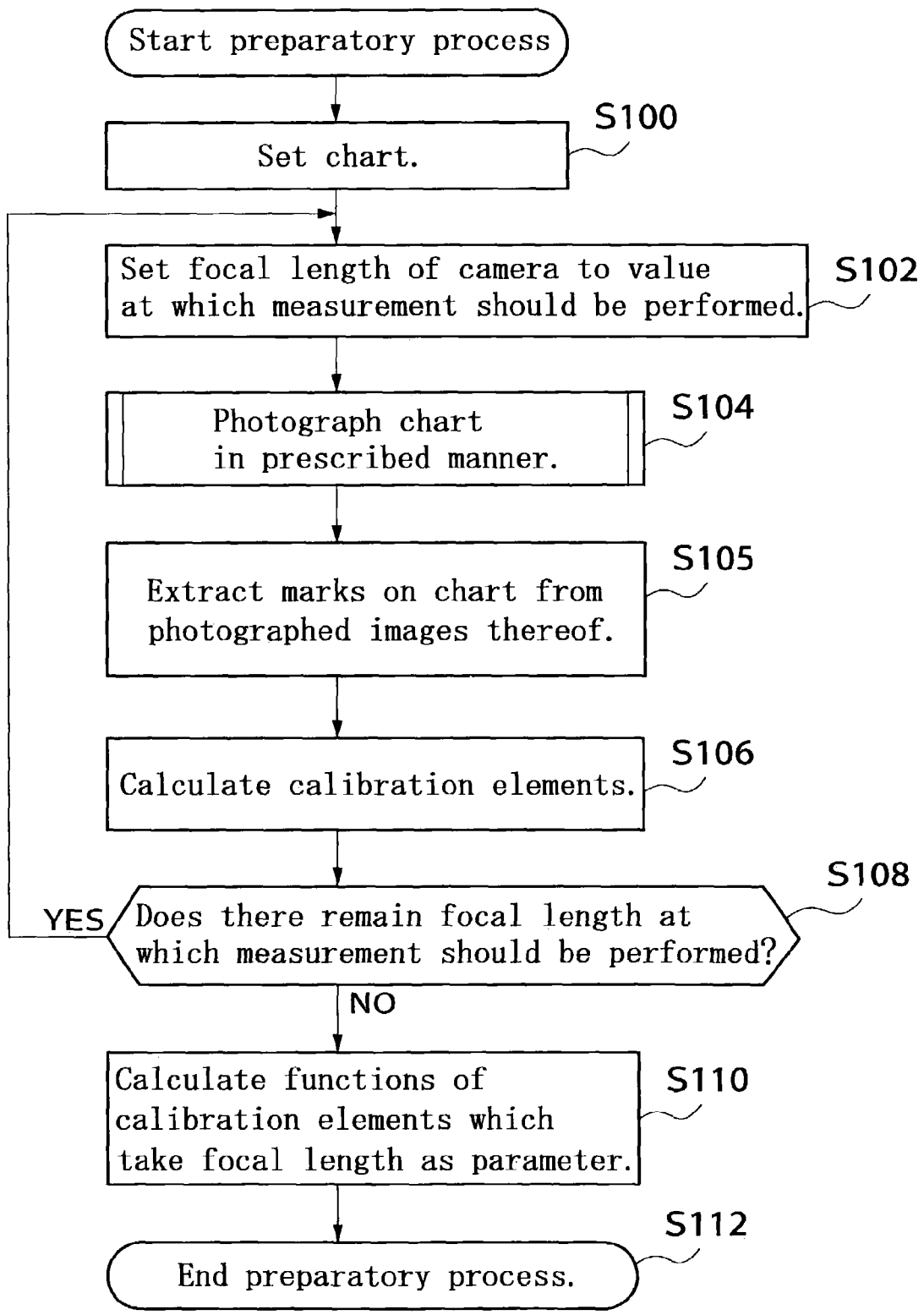
FIG. 8 is a flowchart, explaining a method for measuring data for calibration using a device for measuring data for calibration.

Description will be made of the flow of the process in the device for measuring data for calibration of the present invention. FIG. 8 is a flowchart for explaining the method for measuring data for calibration using the device for measuring data for calibration. Calibration of a camera is a preparatory process of three-dimensional measurement using the camera and thus is herein referred to as preparatory process. The preparatory process is started with setting the chart 1 (S100). Then, the focal length of the camera 2 is set to a target value (S102). For example, when the focal length of the zoom camera 2 can be adjusted from 7.2 mm to 50.8 mm and when the focal length data are collected at six points, one of the values spaced at equal intervals in an optical sense (7.2 mm, 8.7 mm, 11.6 mm, 24.8 mm, 39.0 mm and 52.2 mm) is selected.

Then, chart 1 is photographed with the camera 2 as an object of calibration (S104). The photographing is performed according to the procedure described with reference to FIG. 5 and FIG. 6 in when the lens aberrations at the time when the focal length of the zoom camera is equivalent to that of a normal lens or a wide lens is measured, and performed according to the procedure described with reference to FIG. 7 when the lens aberration at the time when the focal length of the zoom camera is equivalent to that of a telephoto lens is measured. Then, the mark extracting part 131 extracts the marks on the chart from the photographed images of the chart 1 (S105). At this time, the approximate mark position measuring part 132 and the precise mark position measuring part 133 measure the positions of the marks extracted by the mark extracting part 131. Then, the internal parameter calculating part 134 calculates the calibration elements of the camera 2 (S106). The operations of the component parts of the calibration element calculating part 130 (the mark extracting part 131, the approximate mark position measuring part 132, the precise mark position measuring part 133 and the internal parameter calculating part 134) will be described later in detail with reference to FIG. 9 and FIG. 10. Then, it is judged whether there still remains a focal length of the camera 2 at which measurement should be performed (S108). If there still remains a focal length, the process returns to S102. Otherwise, the internal parameter function calculating part 160 calculates functions of the calibration elements which take the focal length as a parameter (S110). Thereby, the preparatory process is completed.

Figure 9:
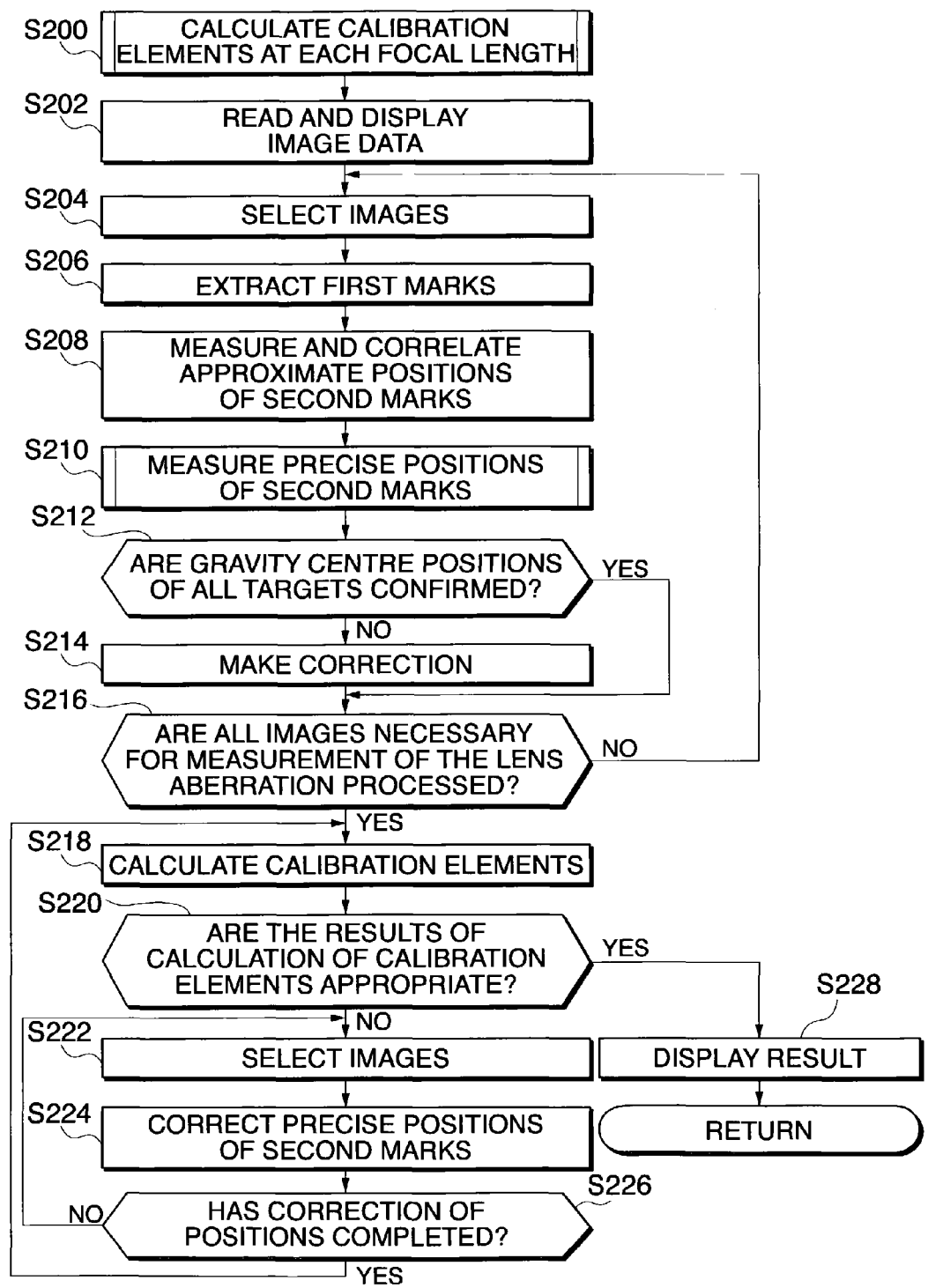
FIG. 9 is a flowchart, explaining the process of calculating calibration elements at each focal length.
Figure 10:
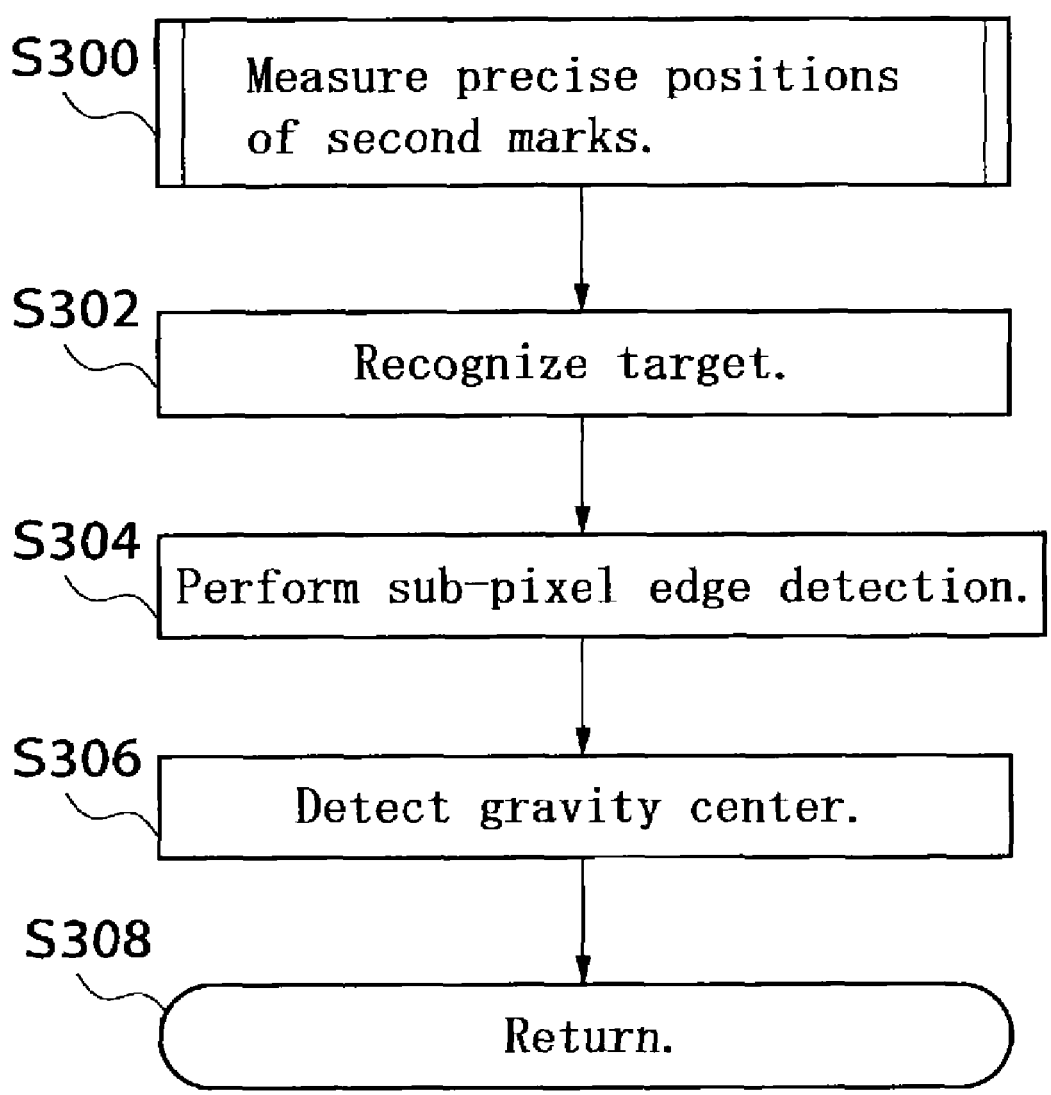
FIG. 10 is a detailed flowchart, explaining the process of measuring the precise position of the second mark.

FIG. 9 is a flowchart for explaining the process of calculating the calibration elements at each focal length. The image data photographed at each focal length from the various angles with the camera 2 in step S104 has been stored in the image data storing part 110. Then, the step S105 is started, a subroutine shown in S200 is executed. The calibration device reads the image data stored in the image data storing part 110 and displays the data on the display part 150 (S202). Then, the operator selects images on which correlating and measurement of targets are performed from the images displayed on the display part 150 (S204). Then, the mark extracting part 131 extracts the first marks from the selected images (S206).

(I): First Mark Extraction Process

In the first mark extraction process, in order to determine second-order equations for projection conversion of the plane coordinates of the chart 1 into image coordinates (camera side), the positions of at least three first marks out of the first marks on the plain coordinate system are measured on the image data. Here, since the first marks include the second marks therein, the positions of the first marks can be designated precisely by designating the positions of the second marks included in the first marks. In the first mark extraction process, the steps I-(1) to I-(4) are repeated for all the first marks. For example, in the case of the chart 1 shown in FIG. 2, the process is performed on the first marks 1a, 1b, 1c and 1d.

I-(1): The operator points the cursor of the mouse to the second mark in the first mark to be detected on the entire image displayed on the display part 150 and clicks the mouse thereon to obtain the approximate position of the first mark.

I-(2): The operator designates an area including the coordinates of the first mark obtained in step I-(1) and the second marks around it from an enlarged view and displays it. At this time, the image including the second marks can be used as a template in measuring the precise positions of the second marks.

I-(3): The operator points the cursor to the gravity center of the second mark on the enlarged image displayed in the step I-(2) and clicks the mouse thereon to make the coordinates the position of the gravity center of the first mark. The positioning in step I-(3) may not be precise because correlating the approximate positions will be performed in a later process.

I-(4): The operator inputs the management number of the second mark corresponding to the position of the gravity center of the first mark measured in step I-(3) to correlate it to the management number of the second mark stored in the mark coordinate storing part 135. At this time, the position of the gravity center of the first mark measured in step I-(3) is attached to the management number of the second mark as reference coordinates.

In the first mark extraction process, when the order of measuring the first marks, for example, on the chart 1 are determined in advance, the number attaching process can be automatically performed on the mark extracting part 130 side even if the operator does not input the management number of the second mark. In the first marks extraction process, for example, the screen of the display part 150 may be divided into two sections and the entire image as shown in FIG. 2 and the enlarged image as shown in FIG. 3(A) or FIG. 3(B) may be displayed in each section to facilitate the operator's work.

The first marks extraction process may be performed using only an entire image as shown in FIG. 2 without using an enlarged image. In this case, the step I-(1) is performed and then the process performed in step I-(4) in the above process, namely the input of the management number of the second mark corresponding to the position of the gravity center of the first mark measured in step I-(1) is performed. Thereby, the steps I-(2) and I-(3) can be omitted because no enlarged image is used. However, since the entire image of the chart is displayed, the first marks are displayed in small sizes. The operator may decide whether to use an enlarged image or not on its preference.

Description will be made of the case where the first mark extraction process is automatically performed by the mark extracting part 131. At first, the external portion of the first mark excluding the second mark is registered as a template. The external portion of the first mark processed first in the first mark extraction process is registered as a template image. Then, the other first marks can be automatically measured by template matching. Also, the correlating of the first marks can be performed with ease since the positions of the first marks are apparent on the image. For example, when the first marks are arranged as shown in FIG. 2, it is easy to correlate the five first marks based on the detected coordinates thereof. The template matching is the same as the target recognizing process (S302) in measurement of precise positions of the second marks and thus is not described here.

Description will be made of the case where the first mark extraction process is performed more automatically by the mark extracting part 131. A template image of the first mark for use in the first mark extraction process is registered in the mark extracting part 131 in advance. Then, the first marks are individually extracted by template matching using the template image of the first mark. Thus, the work of designating the first mark in step I-(1) can be omitted. Namely, when the first marks are apparently different from the second marks, the process can be automated by registering a temporal template image in the mark extracting part 131.

However, since at least three first marks must be measured, the process can be easily performed manually.

Description will be made with reference again to FIG. 9. The approximate mark position calculating part 132 measures and correlates the positions of the second marks (S208) This process include a step of obtaining exterior orientation elements (II-1) and step of calculating the approximate positions of the second marks (II-2).

(II-1): Step of Obtaining Exterior Orientation Elements

The approximate mark position measuring part 132 substitutes the image coordinates of the first marks obtained in step S206 and the reference coordinates corresponding thereto into the second-order equations (2) for projection conversion to set up an observation equation for obtaining parameters b1 to b8:

$$X = (b1 \cdot x + b2 \cdot y + b3)/(b7 \cdot x + b8 \cdot y + 1)$$

$$Y = (b4 \cdot x + b5 \cdot y + b6)/(b7 \cdot x + b8 \cdot y + 1) \quad (2)$$

wherein X and Y represent the reference point coordinates and x and y represents the image coordinates.

Figure 11A:
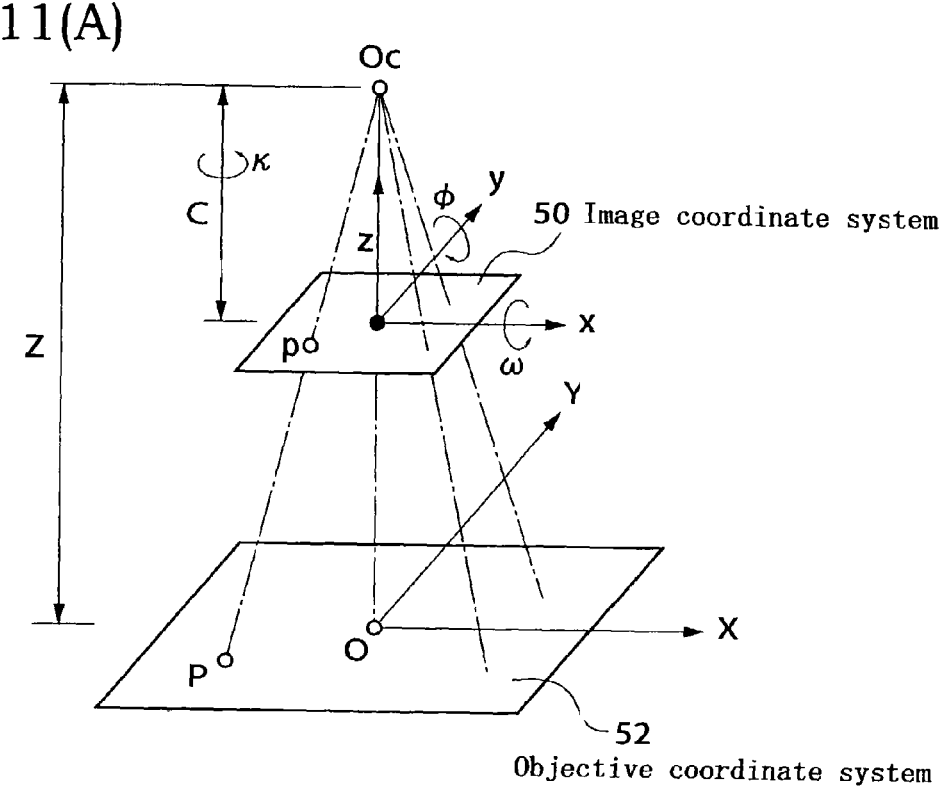
FIG. 11(A) is an explanatory view of an image coordinate system and an objective coordinate system in center projection.

The relation between the reference point coordinates and the image coordinates will be described. FIG. 11(A) is an explanatory view of an image coordinate system and an objective coordinate system in center projection. In center projection, a objective coordinate system 52 as a reference point coordinate system on which the chart 1 is located and an image coordinate system 50 on which the film in the camera 2 or a CCD is located are in the positional relation as shown in FIG. 11(A) with respect to the project center Oc. Here, (X, Y, Z) is the coordinates of an object such as a reference mark on the objective coordinate system 52, (X0, Y0, Z0) are the coordinates of the projection center Oc, (x, y) are the coordinates of a point on the image coordinate system 50, C is the screen distance from the projection center Oc to the image coordinate system 50, and ω, φ and κ are the inclinations of the image coordinate system 50 in photographing with respect to the three axes X, Y and Z, respectively, forming the objective coordinate system 52 and referred to as exterior orientation element.

Then, using the parameters b1 to b8 in the equation (2), the following exterior orientation elements are obtained by the equations (3):

$$\omega = \tan^{-1}(C \cdot b8)$$

$$\phi = \tan^{-1}(-C \cdot b7 \cdot \cos \omega)$$

$$\kappa = \tan^{-1}(-b4/b1) \quad (\phi = 0)$$

$$\kappa = \tan^{-1}(-b2/b5) \quad (\phi \neq 0 \text{ and } \omega = 0)$$

$$\kappa = \tan^{-1}\{-(A1 \cdot A3 - A2 \cdot A4)/(A1 \cdot A2 - A3 \cdot A4)\} \quad (\phi \neq 0 \text{ and } \omega = 0)$$

$$Z0 = C \cdot \cos \omega \cdot \{(A22 + A32)/(A12 + A42)\}^{1/2} + Zm$$

$$X0 = b3 - (\tan \omega \cdot \sin \kappa/\cos \phi - \tan \phi \cdot \cos \kappa) \times (Zm - Z0)$$

$$Y0 = b6 - (\tan \omega \cdot \cos \kappa/\cos \phi - \tan \phi \cdot \sin \kappa) \times (Zm - Z0) \quad (3)$$

Wherein, $A1 = 1 + \tan^2 \phi$, $A2 = B1 + B2 \cdot \tan \phi/\sin \omega$, $A3 = B4 + B5 \cdot \tan \phi/\sin \omega$, $A4 = \tan \phi/(\cos \phi \cdot \tan \omega)$, Zm is the average of the heights of the reference points 1a, 1b, 1c and 1d, and C is the focal length and corresponds to the screen distance. Here, the reference points 1a, 1b, 1c and 1d are on a plain coordinate system and thus assumed to form a uniform height plane.

(II-2): Step of Calculating Approximate Position of Second Marks

Camera coordinate (xp, yp, zp) on an inclined camera coordinate system represented by the image coordinate system 50 corresponding to the coordinates (X, Y, Z) of an object on the ground represented by the objective coordinate system 52 are given by the equation (4) base on the principle of single photograph orientation:

$$\begin{pmatrix} x_p \\ y_p \\ z_p \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \quad (4)$$

-continued $$\begin{pmatrix} \cos\kappa & -\sin\kappa & 0 \\ \sin\kappa & \cos\kappa & 0 \\ 0 & 0 & 1 \end{pmatrix} \begin{pmatrix} X-X_0 \\ Y-Y_0 \\ Z-Z_0 \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} X-X_0 \\ Y-Y_0 \\ Z-Z_0 \end{pmatrix}$$

wherein, (X0, Y0, Z0) are the ground coordinates of the projection center Oc as shown in FIG. 11(A).

Then, the inclinations ($\omega$, $\phi$, $\kappa$) obtained using the equations (3) are substituted into the equation (4) and a rotation matrix calculation is performed to obtain rotation matrix elements a11 to a33.

The thus obtained rotation matrix elements a11 to a33, the coordinates of the position of the camera (X0, Y0, Z0) obtained using the equations (3) and the reference point coordinates (X, Y, Z) of a target are substituted into the equation of collinearity condition (5) to obtain he image coordinates (x, y) of the target. The equation of collinearity condition is a relationship equation which holds when the projection center, a photographed image and an object on the ground are on one line. Thereby, the positions of the second marks without lens aberration are calculated. Thus, the approximate image coordinates of the target in an image photographed with the real camera 2 with lens aberration can be obtained:

$$x = -C \cdot \{a11(X-X0)+a12(X-X0)+a13(Z-Z0)\}/\{a31(X-X0)+a32(X-X0)+a33(Z-Z0)\}$$

$$y = -C \cdot \{a21(X-X0)+a22(X-X0)+a23(Z-Z0)\}/\{a31(X-X0)+a32(X-X0)+a33(Z-Z0)\} \quad (5)$$

In the calculation of $\tan^{-1}$ in the equations (3), two solutions are obtained. Thus, each of the inclinations $\omega$, $\phi$ and $\kappa$ has two solutions. Here, all the solutions are calculated and correct $\omega$, $\phi$ and $\kappa$ are calculated by comparing the residuals between the image coordinates of the four first marks 1a, 1b, 1c and 1d and the image coordinates of the corresponding points obtained using the equations (5).

Although second order equations for projection conversion are used, the present invention is not limited thereto. Other equations for projection conversion such as third equations for projection may be used.

The approximate mark position measuring part 132 correlates the second marks by assigning the management numbers of the second marks attached to a reference point file stored in the mark coordinate storing part 135 or the like to the target (second mark) of each of the first marks.

Description will be made with reference again to FIG. 9. The precise mark position measuring part 133 measures the precise positions of the second marks (S210). The procedure for measuring the precise positions of the second marks will be described in detail with reference to FIG. 10. The precise mark position measuring part 133 recognized the targets as second marks (S302). Template matching using normalized correlation, for example, is used for the target recognition. The targets recognition will be described in detail.

(III) Target Recognition

Figure 11B:
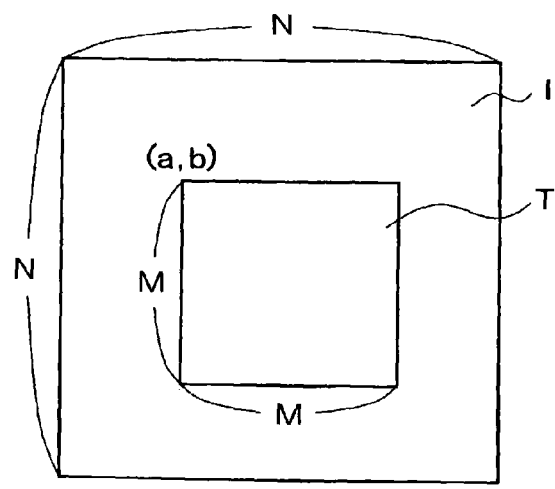
FIG. 11(B) is an explanatory view of a template image for normalized correlation and an objective image for use in recognition of targets.

FIG. 11(B) is an explanatory view of a template image for normalized correlation and an object image for use in the target recognition. At first, an arbitrary target is selected from the gravity centers of the targets of the first marks such as the first marks 1a, 1b, 1c and 1d measured in the first mark extracting step (S206). The template image for normalized correlation is an M×M pixel image centered around the gravity center (image coordinates) of the target. The object image is an N×N pixel image centered around the approximate position (image coordinates) of the target calculated in the step of measuring the approximate positions of the second marks (S208).

Then, template matching according to the normalized correlation expressed by the equation (6) is performed on the object image and the point where the correlation value is maximum is obtained. Superposition is accomplished at the point where the correlation value is maximum and the target is regarded as being recognized at the point. The coordinates of the center of the template image are converted into image coordinates on a same-scale image, which are determined as a detecting point:

$$A = \{M^2 \times \Sigma(Xi \times Ti) - \Sigma Xi \times \Sigma Ti\} / [\{M^2 \times \Sigma Xi^2 - \Sigma(Xi)^2\} \times \{M^2 \times \Sigma Ti^2 - \Sigma(Ti)^2\}]^{1/2} \quad (6)$$

wherein, A represents the correlation value, M represents the side size of the template image, Xi represents the object image and Ti represents the template image. The side sizes N and M are variable but preferably as small as possible to shorten the processing time based on the premise that the target can be sufficiently included in the images.

Description will be made with reference again to FIG. 10. Sub-pixel edge detection is performed on the second marks (S304). The object image on which the sub-pixel edge detection of the second marks is performed is an N×N pixel image centered around the detecting point recognized as a target in step S62. Laplacian-Gaussian filter (LOG filter) as a quadratic differential of a Gauss function expressed by the equation (7) is applied to the brightness waveform in the object image and the two zero crossing points on a curve as a result of calculation, namely the edges, will be detected with sub-pixel accuracy:

$$\nabla^2 \cdot G(x) = \{(x^2 - 2\sigma^2)/2\pi\sigma^6\} \cdot \exp(-x^2/2\sigma^2) \quad (7)$$

wherein, $\sigma$ represents the parameter of the Gauss function. To detect with sub-pixel accuracy means to perform position detection with higher accuracy than one pixel.

Then, the gravity center of the target is detected (S306), and the process is returned (S308). Here, the position where of the cross point of edges in the x and y directions cross each other obtained using the equation (7) is determined as the position of the gravity center of the target. The measurement of the precise positions of the second marks is not necessarily performed by the process comprising steps S302 to S306. The precise positions of the second marks may be obtained by another gravity center position detection method such as a moment method or a modified template matching method.

Description will be made with reference again to FIG. 9. It is confirmed that there is no apparent error in the positions of the gravity centers of all the targets (S212). Namely, it is judged whether the position detection of the recognized targets was appropriate. For the convenience of the operator, the positions of the detected targets are displayed on the display part 150. When there is no error, the process goes to step S216. When there is error, inappropriate target positions are corrected (S214). Targets the correlation values of which calculated in step S302 are low or targets the detected gravity center positions of which are far apart from their approximately positions are displayed on the display part 150 in such a manner that the operator can easily recognize, in red, for example. The operator manually recalculates the positions of such targets (designates the gravity center positions thereof with the mouse). The erroneous target positions are not necessarily corrected here. They can be removed since they are detected as abnormal points in the process for obtaining calibration parameters in step S218.

The process comprising steps S204 to S214 are performed on for all the images necessary for the measurement of the lens aberration (S216). For example, when five images were photographed, the process may be performed on the five images. When sufficient number of images for the measurement of the lens aberration has been processed, the other photographed images may not be necessarily processed.

When a sufficient number of images for the measurement of the lens aberration have been processed, a process for obtaining calibration elements for the lens aberration using the process for calculating the internal parameter performed in the internal parameter calculating part 134 is performed (S218). The calculation of calibration elements is performed on all the second marks which have been correlated and whose gravity centers have been obtained by the processes in the approximate mark position measuring part 132 and the precise mark position measuring part 133.

(IV): Process for Calculating Internal Parameters of Camera (Bundle Adjustment with Self-calibration)

For the process for calculating the internal parameters of the camera in the internal parameter calculating part 134 is, "bundle adjustment with self-calibration" used in the field of photogrammetry is used. The "bundle adjustment" is a method in which an observation equation is set up for each of light bundles of each image based on the collinearity condition that light bundles connecting the object, lens and CCD surface should be on one line, and the position and the inclination of the camera (exterior orientation elements) and the coordinate positions of the second marks are simultaneously adjusted by a least square method. With the "bundle adjustment with self-calibration", the calibration elements, namely the inner orientations of the camera (lens aberration, principle point position and focal length) can be also obtained. The collinearity condition basic equations of bundle adjustment with self-calibration (which will be hereinafter referred to as "bundle adjustment") are the following equations (8) and (9):

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (8)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \quad (9)$$

The equations (8) and (9) are based on the equation of collinearity condition (5) for single-photograph orientation described in describing the first mark extraction process. Namely, the bundle adjustment is a method in which various solutions are obtained from a plurality of images by least square approximation, and by which the exterior orientation positions of the camera at different photographing positions can be obtained at the same time. Namely, the calibration elements of the camera can be obtained.

The following equation (10) is an example of a correction model for an inner orientation (lens aberration) applied to a lens with distortion in the radial direction:

$$\begin{cases} \Delta x = x_0 + x(k_1 r^2 + k_2 r^4) \\ \Delta y = y_0 + y(k_1 r^2 + k_2 r^4) \\ r^2 = (x^2 + y^2)/c^2 \end{cases} \quad (10)$$

$k_1$, $k_2$: Lens distortion in the radial direction

The correction model is not limited to the above one. A correction model suitable for the lens may be selected. The calculation can be made by a successive approximation method when there are at least 6 reference points on the ground coordinate system and the image coordinate system. The internal parameter calculating part 134 has a threshold value of the successive approximation method and removes the second marks on the chart 1 whose error is not smaller than the threshold value to obtain precise calibration elements. Thus, the second marks which were not detected as erroneous marks in the step of confirming the gravity centers of the targets (S212) can be detected and removed in step S218.

Description will be made with reference again to FIG. 9. The result of calculation for obtaining the calibration elements by the internal parameter calculating part 134 is judged (S220). When the calculation did not converge or there are inappropriate calibration elements in the obtained calibration elements, the problems are solved in step S222. In step S222, images including erroneous second marks are selected. Since it has become apparent which second marks of which images have error by the internal parameter calculating part 134 when the calibration in step S218 was completed, the detecting points of the targets are displayed for confirmation.

The operator manually corrects the erroneous second marks (S224). Namely, since the coordinates of the gravity center of the erroneous second marks are shifted, the correction is made by moving the mark displayed as erroneous second marks to the gravity center position displayed as being appropriate. Then, it is judged whether the correction of the positions of the erroneous second marks has been completed (S226). When the correction has been completed, the process returns to the step of calculating the calibration elements in step S218, and the calibration elements are calculated again. If there are other second marks to be corrected, the process returns to step S222 and the operation for correcting the positions of erroneous second marks is repeated.

Figure 12:
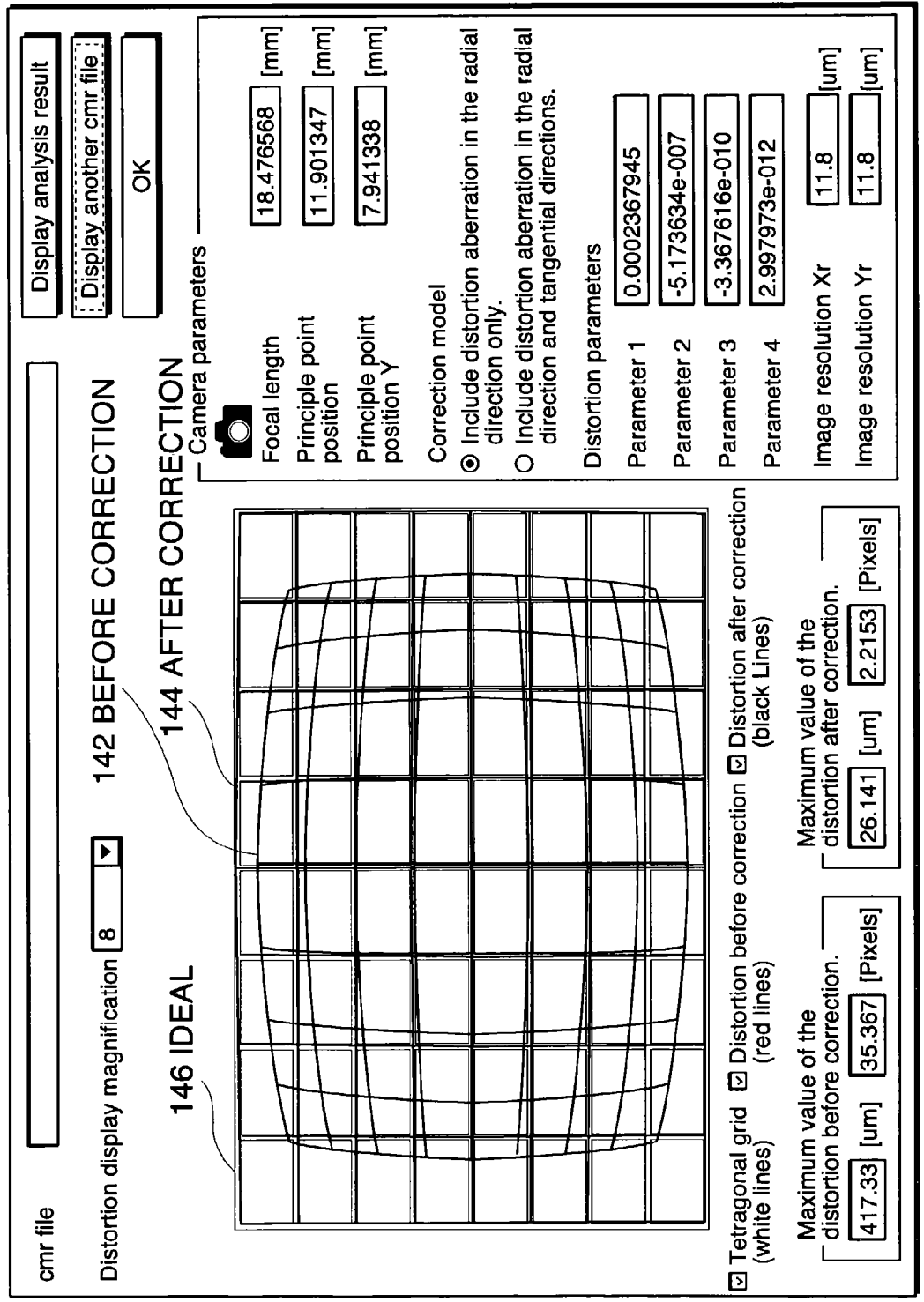
FIG. 12 is an explanatory view, illustrating an example of a screen which displays the result of the operation for obtaining the calibration elements.

When the result of operation for obtaining the calibration elements is appropriate, the result is displayed on the display part 150 (S228). FIG. 12 is an explanatory view illustrating an example of a screen displaying the result of the operation for obtaining the calibration elements. For example, the focal length, principle point position and distortion parameters as the calibration elements are displayed on the display part 150. As for distortion representing the lens aberration, curves 142 before correction, curves 144 after correction, and ideally corrected curves 146 may be displayed in graphical form for easy understanding.

In addition, an image whose distortion has been corrected based on the result of the calibration may be formed in the image processing part 140 and displayed on the display part 150. Thereby, an image displaying device which can correct an image photographed with a camera with large distortion can be provided.

Figure 13A:
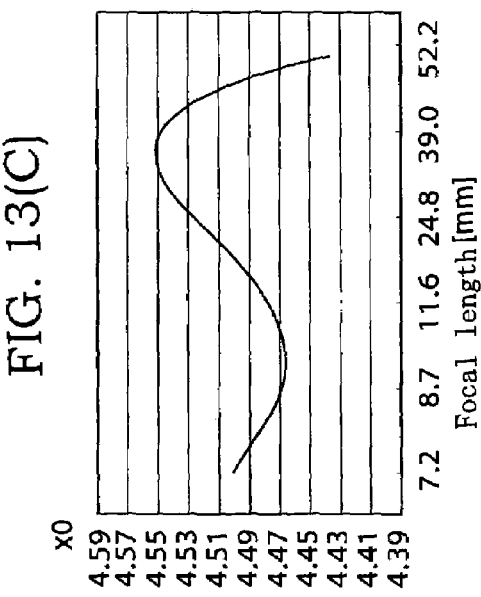
FIGS. 13(A)-13(D) are views, illustrating the relation between the focal length and the coefficients for use in the internal parameter functions.
Figure 13B:
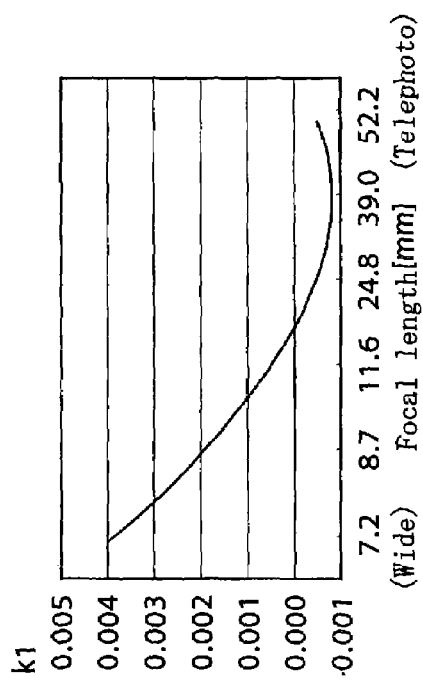
Figure 13C:
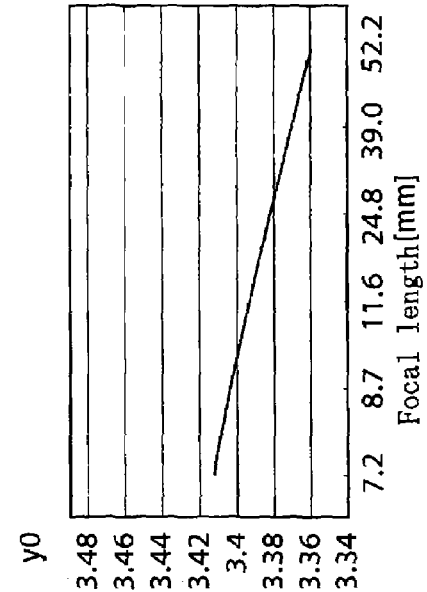
Figure 13D:
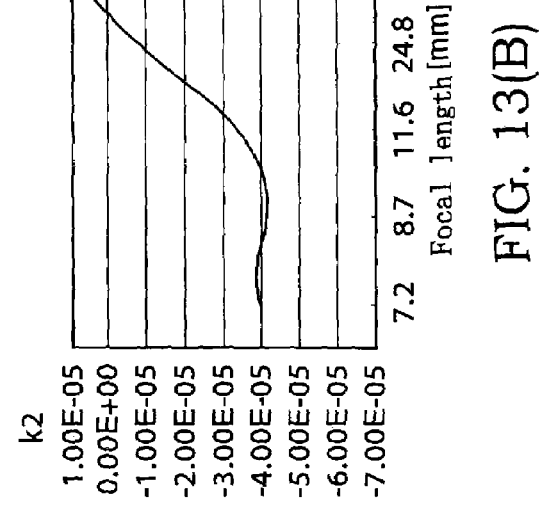

Description will be made of examples of the result of the calculation of a function of a calibration element which takes the focal length as a parameter performed in the internal parameter function calculating part 160 using the internal parameters calculated in the calibration element calculating part 130. FIG. 13 is a view illustrating the relation between the focal length and the coefficients for use in the internal parameter functions. FIG. 13(A) shows the relation between the focal length and a coefficient k1 in the equation (10), FIG. 13(B) shows the relation between the focal length and a coefficient k2 in the equation (10), FIG. 13(C) shows the relation between the focal length and a coefficient $x_0$ of deviation in the x-axis direction of the principle point of the camera from the center of the image on an image coordinate system x, and FIG. 13(D) shows the relation between the focal length and a coefficient $y_0$ of deviation in the y-axis direction of the principle point of the camera from the center of the image on an image coordinate system y. As described before, the zoom camera 2 in which the focal length can be adjusted from 7.2 mm to 50.8 mm is taken here as an example. When the focal length data are measured at six points, the measurement is performed at focal lengths of 7.2 mm (wide end) and 52.2 mm (telephoto end), and 8.7 mm, 11.6 mm, 24.8 mm, 39.0 mm are selected as the measuring point between them to perform measurement at equal intervals in an optical sense.

The coefficient k1 in the equation (10) is maximum at the wide end and small on the telephoto side. The coefficient X0 varies in a complex manner; it takes the minimum value of 4.46 when the focal length of the zoom camera 2 is 8.7 mm and 52.2 mm and the maximum value of 4.55 when the focal length of the camera 2 is 39.0 mm and thus is approximated with a curve of the fifth order. The coefficient $y_0$ varies monotonously with the focal length of the zoom camera 2. The chart is photographed in focus, so that the focal length f of the zoom camera 2 and the distance C from the projection center point Oc to the image coordinate system 50 are equal.

In the internal parameter function calculating part 160, when the focal length f is input, the coefficients k1, k2, $x_0$ and $y_0$ for use in the internal parameter functions are obtained. Then, the coefficients are substituted into the equations (8), (9) and (10) as the internal parameter functions to set up observation equations for each of the measuring points. Then, by solving the equations simultaneously and applying a least square method, the most provable internal parameters can be calculated.

Figure 14:
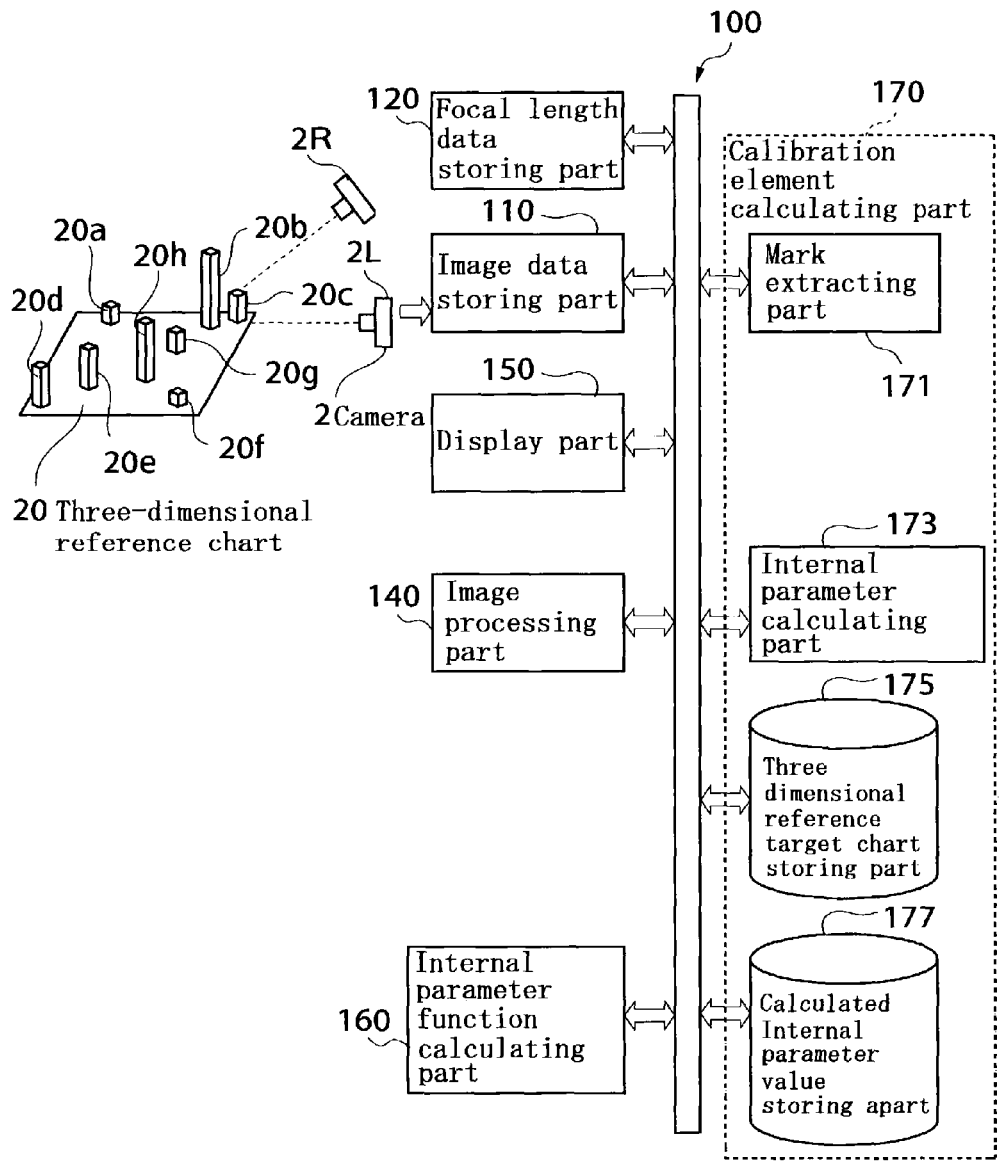
FIG. 14 is a block diagram, illustrating a device for measuring data for calibration according to a second embodiment of the present invention.

FIG. 14 is a block diagram illustrating a device for measuring data for calibration according a second embodiment of the present invention. Although the flat chart 1 is used as the chart for calibration in the embodiment shown in FIG. 1, a three-dimensional reference chart 20 is used in the second embodiment. In FIG. 14, those parts corresponding to the components in FIG. 1 are identified with the same numerals, and their description will be omitted.

The three-dimensional reference chart 20 shown in FIG. 14 has targets 20a to 20h whose positions have been three-dimensionally measured with precision. The number, heights, and plane coordinates are appropriately determined so that the chart 20 can be suitable for three-dimensional measurement. The camera 2 is used to photograph the three-dimensional reference chart 20 in stereo at a pair of right and left photographing positions 2L and 2R. The data of a pair of stereo images photographed with the camera 2 are sent to an image data storing part 110 via an image information recording medium or the like. The distance between the right and left photographing positions 2R and 2L, which is referred to as baseline distance, is measured precisely.

A calibration element calculating part 170 calculates the internal parameters of the camera 2 when the three-dimensional reference chart is used and has a mark extracting part 171, internal parameter calculating part 173, three-dimensional chart target recording part 175 and a calculated internal parameter value recording part 177.

The mark extracting part 171 extracts targets 20a to 20h included in the stereo images of the three-dimensional chart 20 and measures the positions of the targets 20a to 20h on an image coordinate system. The internal parameter calculating part 173 calculates the internal parameters of the camera 2 as data for calibration using the data on the positions of the targets 20a to 20h measured in the mark extracting part 171 and the positions of the targets 20a to 20h stored in a three-dimensional reference chart target storing part 175, and adjusts the exterior orientation elements and the coordinates of objective points of the data of the paired right and left stereo images simultaneously. The positions of all the targets 20a to 20h of the three-dimensional chart 20 are stored in the three-dimensional reference chart target storing part 175. The internal parameters calculated in the internal parameter calculating part 173 are stored in the calculated internal parameter value storing part 177.

The mark extracting part 171 is preferably provided with a function of removing the stereo images of the three-dimensional reference chart 20 in which the targets 20a to 20h does not clearly appear. The internal parameters of the camera calculated in the internal parameter calculating part 173 are preferably stored in the calculated internal parameter value storing part 177 together with the focal lengths at which the three-dimensional reference chart was photographed.

Description will be made of the method for measuring data for calibration using the device constituted as above with reference again to FIG. 8. First, the three-dimensional reference chart 20 is set (S100), and the focal length of the camera 2 is set to a target value (S102). Then, the three dimensional reference chart 20 is photographed with the camera 2 as an object of calibration (S104). In this case, the three-dimensional reference chart 20 is photographed at a prescribed camera distance without adjusting the focal length of the zoom camera.

Then, the mark extracting part 171 extracts marks formed on the chart 1 from the images taken from the chart (S105). The internal parameter calculating part 173 calculates the calibration elements of the camera 2 (S106). The operation of the component parts of the calibration element calculating part 170 (mark extracting part 171 and the internal parameter calculating part 173) is as follows. The mark extracting part 171 extracts the targets 20a to 20h photographed in the stereo images of the three-dimensional reference chart 20 and measured the positions of the targets 20a to 20h on an image coordinate system. Then, the internal parameter calculating part 173 calculates the internal parameters of the camera 2 as data for calibration using the data on the positions of the targets 20a to 20h measured in the mark extracting part 171 and the positions of the targets 20a to 20h stored in a three-dimensional reference chart target storing part 175. The internal parameters of the camera calculated in the internal parameter calculating part 173 are stored in the calculated internal parameter value storing part 177 together with the focal lengths at which the three-dimensional reference chart was photographed.

Then, it is judged whether there still remains a focal length of the zoom camera 2 at which (S108) measurement should be performed. If there still remains a focal length, the process returns to S102 and a calibration data measuring device 100 measures the internal parameters of the camera at the focal length. Otherwise, the internal parameter function calculating part 160 calculates the functions of the calibration elements which take the focal length as a parameter (S110). Thereby, the preparatory process is completed.

Figure 15:
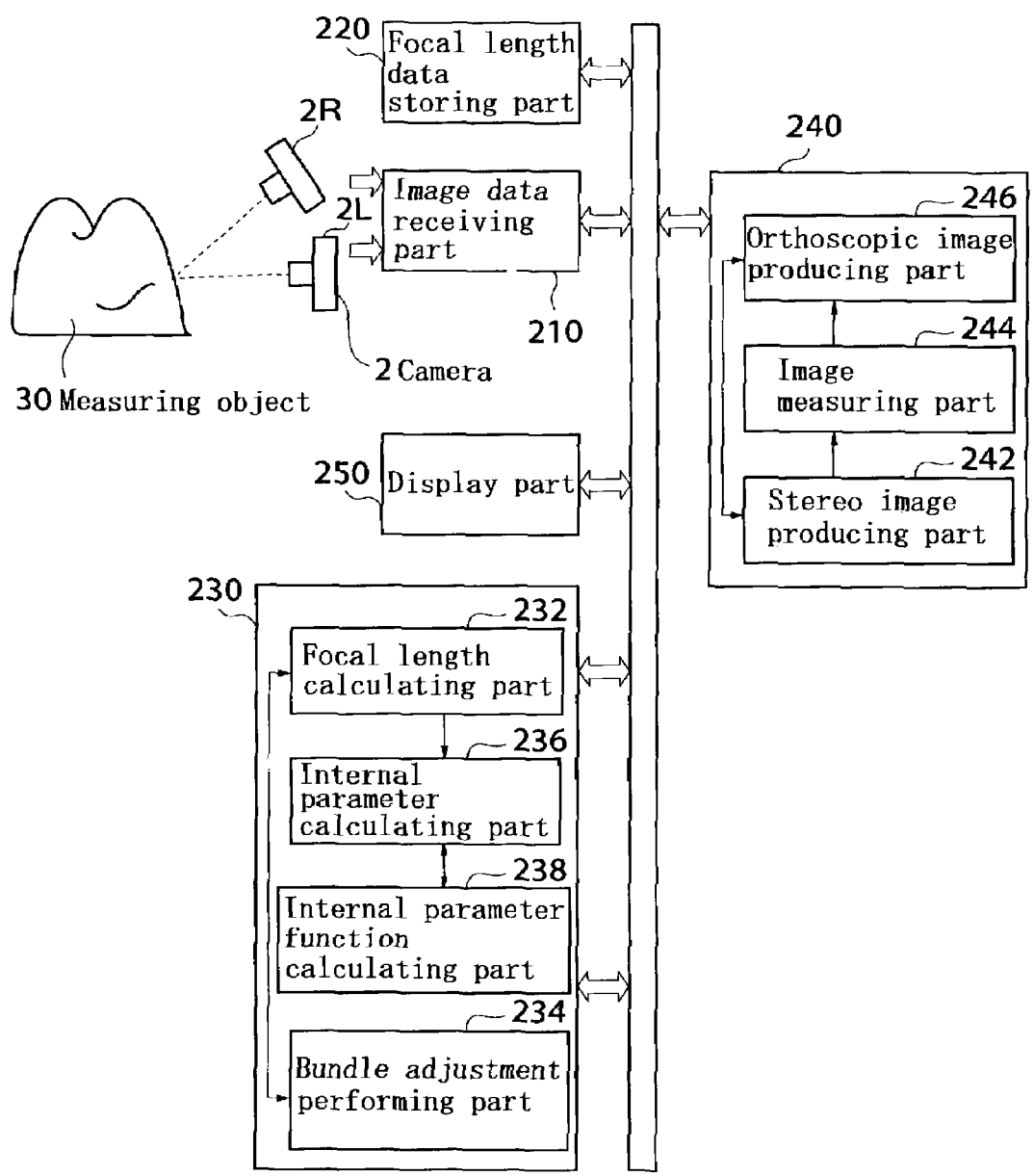
FIG. 15 is a block diagram, illustrating an image data processing device according to an embodiment of the present invention.

FIG. 15 is a block diagram illustrating an image data processing device according to an embodiment of the present invention. Designated as 200 is an image processing device. In the image processing device 200, the calibration data measuring device 100 performs image measurement using stereo images of an object 30 photographed with the camera 2 whose internal parameters as data for calibration have been measured. The object 30 is an object having a three-dimensional the three-dimensional such as an object in an archeological site, a civil engineering site, disaster-prevention work site or an urban-planning site or a large-scale structure such as a turbine in a power plant, aircraft or a ship.

The stereo image data of the object 30 photographed with the camera 2 is stored in an electromagnetic recording medium such as a flexible disc as a pair of right and left stereo images. An image data receiving part 210 is an I/O device for receiving the stereo image data of the object 30 photographed with the camera 2. A device for reading an electromagnetic recording medium is used as the image data receiving part 210. When the focal length at which the stereo images of the object were photographed was measured, a focal length data storing part 220 transmits the focal length to the image data processing device 200.

A calibration data forming part 230 forms internal parameters necessary for measurement from the stereo image data stored in the image data receiving part 210, and has a focal length calculating part 232, a bundle adjustment performing part 234, an internal parameter calculating part 236, and an internal parameter function calculating part 238. The focal length calculating part 232 calculates the focal length of the camera 2 at the time of photographing using the stereo image data stored in the image data receiving part 210 using the bundle adjustment performing part 234. When the focal length the camera 2 at the time of photographing stored in the focal length storing part 220 is precise, the values stored in the focal length storing part 220 may be used as the focal length calculated in the focal length calculating part 232 or may be used as the initial values for the calculation in the focal length calculating part 232.

The internal parameter calculating part 236 calculates coefficients k1, k2, $x_0$ and $y_0$ for use in calculation of internal parameter functions in the internal parameter function calculating part 238 using the focal length calculated in the focal length calculating part 232. The internal parameter calculating part 238 has the same function as the internal parameter function calculating part 160 of the calibration data measuring device 100 and calculates the internal parameters of the camera 2.

An image processing part 240 has a stereo image producing part 242, an image measuring part 244, and an orthoscopic image producing part 246. The stereo image producing part 242 has a function of performing orientation (relative orientation and absolute orientation) and displacement correction of the stereo images photographed with the camera to form displacement-corrected images and is typically constituted of software executable by a computer. The displacement-corrected images herein are stereo vision images obtained by correcting the displacement in the paired right and left stereo images photographed with the camera 2. The image measuring part 244 performs absolute orientation on the stereo images produced in the stereo image producing part 242 to calculate the ground coordinates of each pixel. The process is disclosed in detail in JP-A-H11-351865 filed by the same applicant. By using the image measuring part 244, it is possible to measure a three-dimensional configuration such as the evenness on a surface of the object 30 precisely.

The orthoscopic image producing part 246 performs three-dimensional measurement on the stereo images stored in the image data receiving part 210 using the image measuring part 244 with the internal parameters of the camera 2 calculated in the calibration data forming part 230 to convert the stereo images into orthoscopic images. An orthoscopic image is an orthogonal projection image obtained by correcting displacement in an image due to the inclination or the specific height of the camera based on photogrammetry techniques. The stereo image data stored in the image data receiving part 210 are central projected images. The orthoscopic image producing part 246 converts the stereo image data from central projection images into orthogonal projection images to form a detailed image drawing of the object 30.

Description will be made of the relative orientation in detail. Orientation calculation is used in the fields of aerial photogrammetry and so on, and the positions of the right and left photographing devices and so on can be obtained through relative orientation and absolute orientation. In relative orientation, stereo photographing parameters is obtained by the following coplanar conditional equation.

Figure 16:
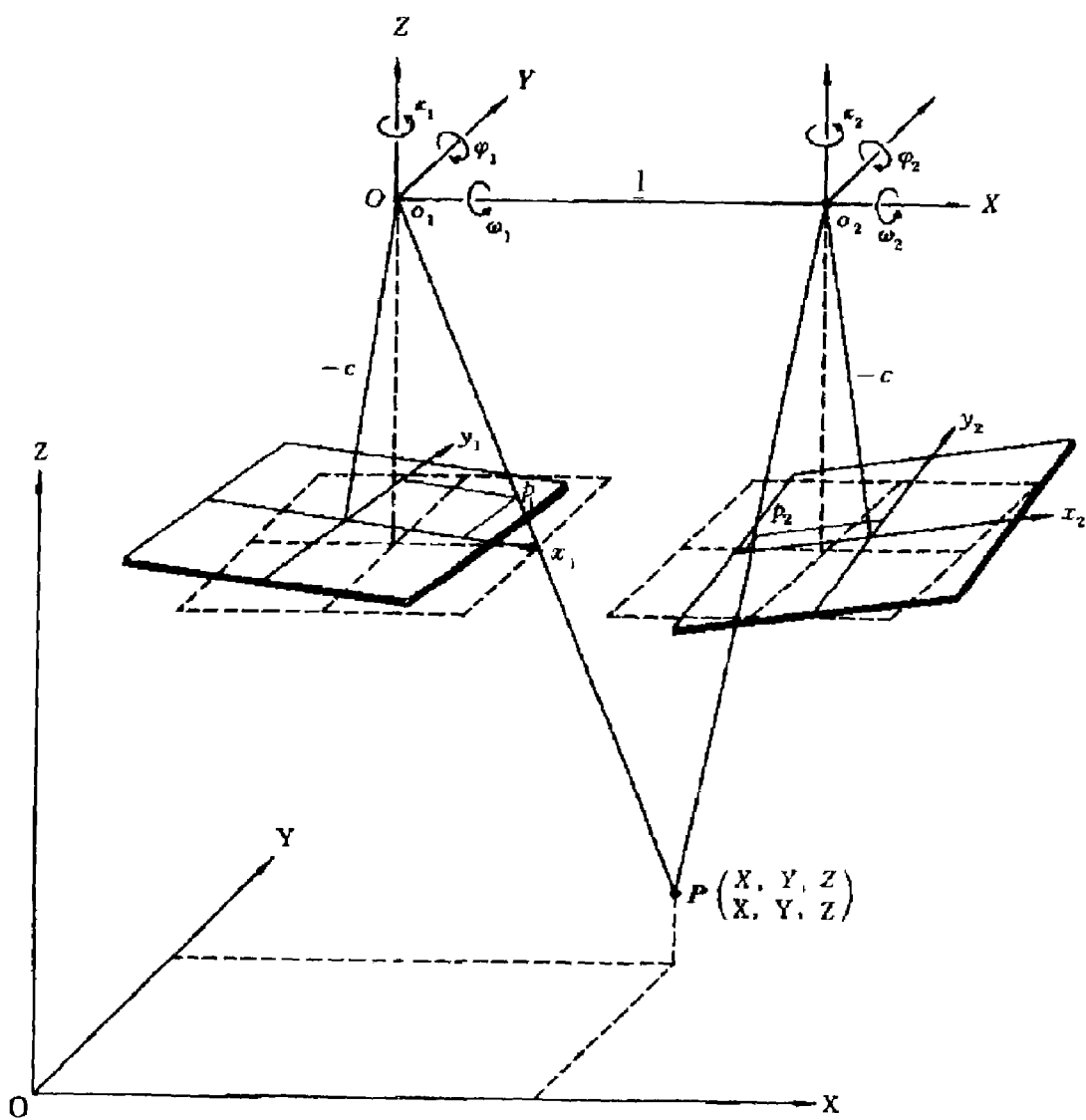
FIG. 16 is a view for explaining orientation calculation using a model coordinate system XYZ and right and left camera coordinate systems xyz.

FIG. 16 is a view for explaining the orientation calculation using a model coordinate system XYZ and right and left camera coordinate systems xyz. The origin O of the model coordinate system is placed at the left projection center and a line connecting the origin O and the right projection center is designated as the X-axis. The baseline length l is used as the unit length. The parameters to be obtained are the following five rotational angles: the rotational angle $\kappa 1$ of the Z-axis and the rotational angle $\phi 1$ of the Y-axis of the left camera, and the rotational angle $\kappa 2$ of the Z-axis, the rotational angle $\phi 2$ of the Y-axis and the rotational angle $\omega 2$ of the X-axis of the right camera. The rotational angle $\omega 1$ of the X-axis of the left camera is zero and thus is not needed to be taken into account:

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = C \tag{11}$$

$X_{01}, Y_{01}, Z_{01}$: Projection center coordinates of a left picture $X_{02}, Y_{02}, Z_{02}$: Projection center coordinates of a right picture $X_1, Y_1, Z_1$: Image coordinates of a left picture $X_2, Y_2, Z_2$: Image coordinates of a right picture Under the above conditions, the coplanar conditional equation (12) of the equation (11) is given as follows and the parameters can be obtained by solving the equation:

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \tag{12}$$

The following relationship equations hold between the model coordinate system XYZ and the camera coordinates xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \tag{13}$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix}$$
$$\begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Using the equations (11) to (13), unknown parameters are obtained according to the following procedure.

V-1: The initial approximate value is generally set to 0.

V-2: The Taylor development is performed on the coplanar conditional equation (12) around the approximate and a differential coefficient of linearization is obtained with the two equations (13) to set up an observation equation.

V-3: A least square method is applied to obtain a correction value with respect to the approximate value.

V-4: The approximate value is corrected.

V-5: The steps V-2 to V-5 are repeated using the corrected approximate value until convergence.

In the above relative orientation calculation, the calibration elements calculated in the internal parameter function calculating part 238 are used. More specifically, the principle point position ΔX and the lens aberration ΔY are corrected with the calibration elements. The screen distance (focal length) c is calculated using the calibration elements.

Figure 17:
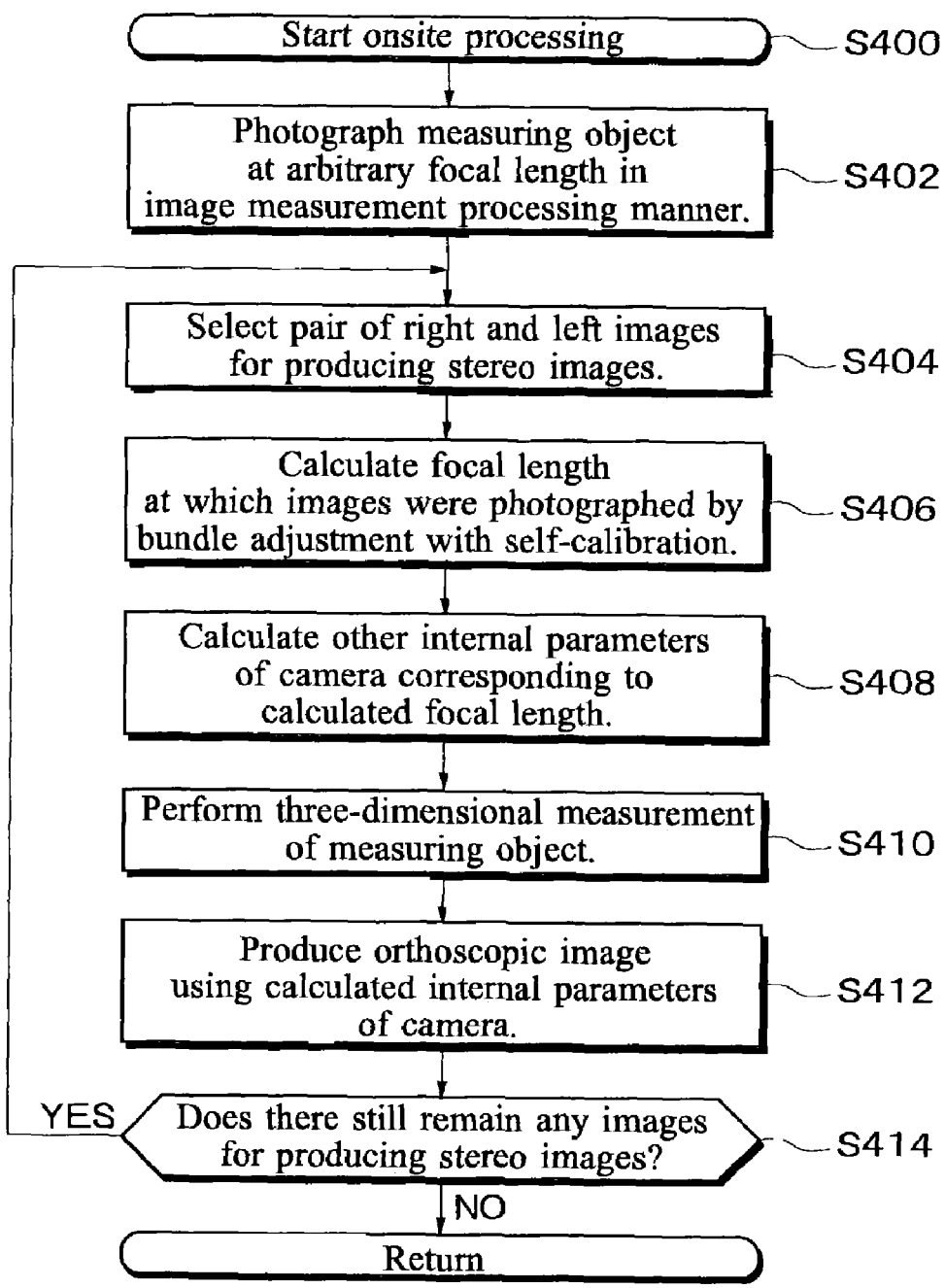
FIG. 17 is a flowchart for explaining the process of photographing an object in stereo on site and performing stereo image measurement.

Description will be made of the procedure of the three-dimensional measurement using the image data processing device constituted as above. FIG. 17 is a flowchart for explaining the procedure of photographing an object in stereo on site and performing stereo image measurement. In onsite processing, an operator goes to the site where the object is located and a camera whose internal parameter functions have been obtained with a calibration data measuring device is used (S400). The operator photographs the object at an arbitrary focal length with the camera 2 in an image calculating processing manner (S402). To photograph in an image measurement processing manner means to photograph images of an object continuously at a distance for stereoscopic viewing as in aerial photogrammetry. For example, the images are photographed in such a manner that the images are overlapped by about 60% in the lateral direction of the object and about 20% in the vertical direction of the object. The photographed images are stored in an electromagnetic recording medium in such a manner as to be able to be sent to the image data receiving part 210.

The image data stored in the electromagnetic recording medium are received by the image data receiving part 210, and a pair of right and left images for producing stereo images are selected (S404). The focal length calculating part 232 calculates the focal length at which the images were photographed by bundle adjustment with self-calibration (S406). Then, the internal parameter calculating part 236 calculates the other internal parameters of the camera 2 corresponding to the calculated focal length (S408).

Since the positions and inclination of the stereo images are obtained by exterior orientation element calculation by relative orientation, the stereo image producing part 242 produces final stereo images by adding the internal parameters of the camera 2. Then, the image measuring part 244 performs three-dimensional measurement of the object in the stereo images (S410). The orthoscopic image producing part 246 forms orthoscopic images free from the effect of the aberration of the lens using the calculated parameters of the camera 2 based on the three-dimensional measurement data (S412). Then, it is judged whether there still remain paired right and left images for producing stereo images in the image data storing part 210 (S414). If there remain images, the process returns to step S404. Otherwise, the three-dimensional measurement of the object can be performed in a region in which the object can be viewed stereoscopically.

Figure 18:
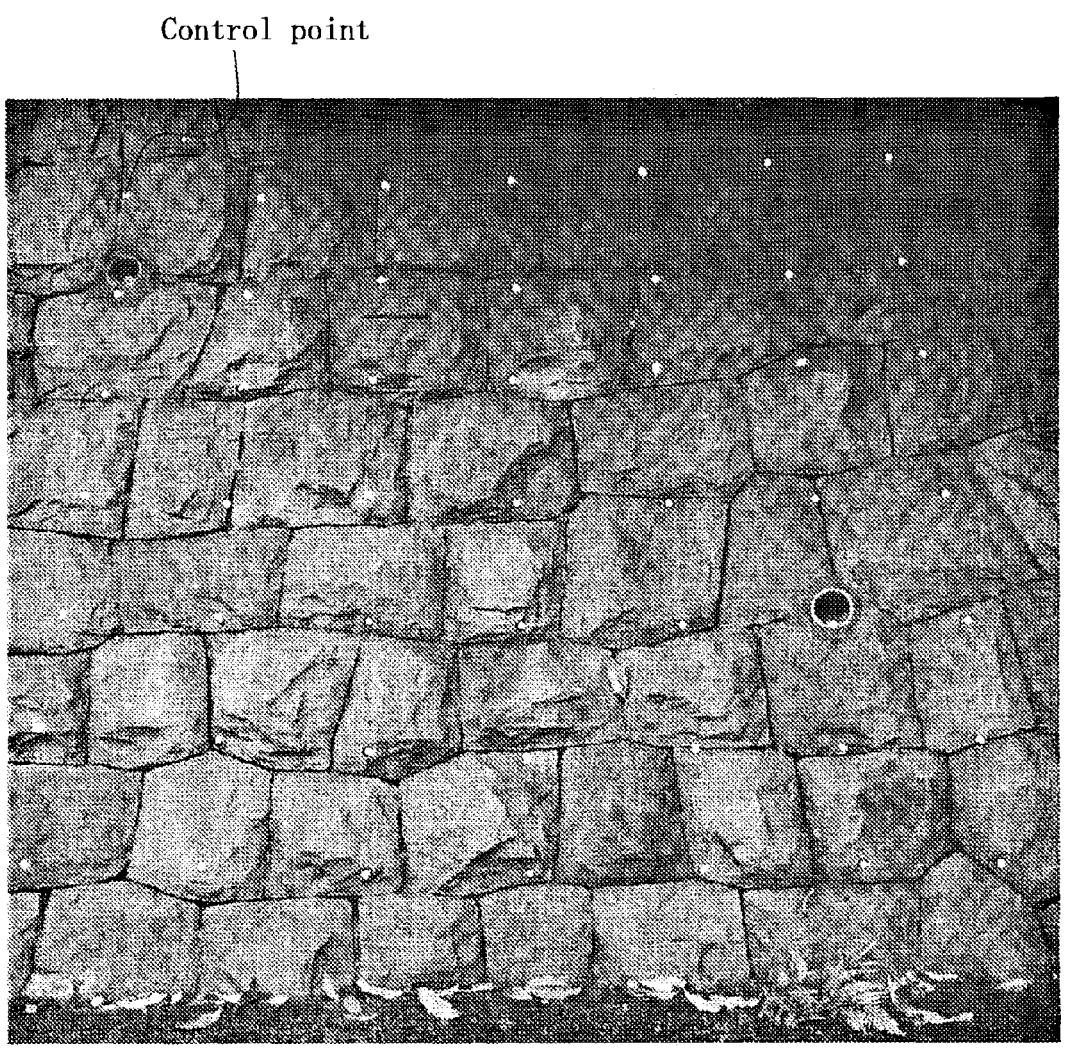
FIG. 18 shows a stone wall as an example of a field for stereo image measurement.

Description will be made of an example in which stereo image measurement is performed in a real field using the image data processing device 200. FIG. 18 shows a stone wall as an example of the field for stereo image measurement. A stone wall has a three-dimensional configuration similar to a real field such as a historical site or a civil engineering site and thus is suitable for a field for experiment. In the field for stereo image measurement shown in FIG. 18, there are 49 control points represented by the white dots, and their positions have been measured with a depth accuracy of ±1 mm. In the image data processing device 200, eight points selected from the 49 control points are used for calculation of the focal length of the camera as control points for use in the bundle adjustment with self-calibration. The other 41 control points are used for measurement of depth accuracy by stereo image measurement.

FIG. 19 is a view illustrating the photographing conditions of the camera, and shows the object distance H and the photographing baseline length B corresponding to the focal lengths equivalent to those of wide, intermediate and telephoto lenses. The focal length of the camera 2 (approximate value) is set to 9 mm in case 1 (wide), 30 mm in case 2 (normal), and 42 mm in case 3 (telephoto). The size of the photographed area of the stone wall is 2 m×2 m.

FIG. 20 is a view showing the results of experiment for measuring the accuracy of the stereo image measurement, showing the focal length (analysis value) [mm], [μm], plain accuracy [mm], depth accuracy [mm], one-pixel resolution $\sigma_{xy}$ on the plane [mm], and one-pixel resolution $\sigma_z$, in the depth direction. The one-pixel resolution $\sigma_{xy}$ on the plane, and one-pixel resolution $\sigma_z$, in the depth direction are expressed by the following equations, respectively;

$$\sigma_{xy} = [H/f] \times \sigma_p \qquad (14)$$

$$\sigma_z = [H/f] \times [H/B] \times \sigma_p \qquad (15)$$

wherein, H, B, f and $\sigma_p$ represent the object distance, the baseline length, the focal length and the pixel size.

In each column of the FIG. 20, the value in the case where the internal parameters of the camera are corrected and the value in the case where the internal parameters of the camera 2 are not corrected are in the upper raw and the lower row, respectively. The depth accuracy is within 2 mm at any focal length. On the contrary, when the internal parameters of the camera 2 are not corrected, the depth accuracy is on the order of 2 cm. Namely, when the internal parameters of the camera 2 are corrected according to the focal length, the depth accuracy improves by an order of magnitude as compared with the case where the internal parameters of the camera 2 were not corrected.

In the above embodiment, description has been made of a case in which the optical condition to be varied in a camera of the type in which optical conditions can be varied is the focal length of a zoom camera. However, the present invention is not limited thereto. The condition to be varied in a camera may be the moving distance of the lens in an auto-focal camera or an internal parameter of a camera which are adjusted when the wavelength of light other than visible light such as infra-red rays, ultraviolet rays, X-rays or charged particle beam received by the camera as image data varies.

In the above embodiment, a case where the image processing device has a stereo image producing part for performing three-dimensional measurement to produce orthoscopic images. However, the image data processing device of the present invention is not limited thereto. The image data processing device may perform three-dimensional measurement of an object directly without producing orthoscopic images.

As has been described above, the device for measuring data for calibration of the present invention calculates data for calibration corresponding to the varied optical conditions of the camera in photographing using data for calibration calculated in the internal parameter calculating part and a plurality of optical conditions under which the images of the chart are photographed. Thus, when images are photographed with a camera of the type in which optical conditions can be varied under varied conditions, data for calibration corresponding to the varied conditions in the camera in photographing necessary to produce a high-quality image free from the effect of the lens distortion can be easily obtained.

The image data processing device of the present invention has an image data receiving part for receiving data of photographed images and optical photographing conditions from a camera of the type in which optical conditions can be varied, a calibration data forming part for forming data for calibration based on the optical photographing conditions received by the image data receiving part; and an image processing part for processing the data of photographed images based on the data for calibration. Thus, when images are photographed with a camera of the type in which optical conditions can be varied under varied conditions, high-quality images free from the effect of the lens distortion can be easily obtained using the data for calibration corresponding to the varied conditions in the camera in photographing.

What is claimed is:

1. A device for obtaining data for calibration of a camera capable of operating under varying optical conditions, using a plurality of images of a calibration chart comprising first marks and second marks, the first marks being more easily recognizable than the second marks, the images being photographed with said camera under varied optical conditions, comprising:

a mark extracting part for extracting said second marks from said images photographed respectively under the varied optical conditions using at least three different photographing angles, the photographing angles being set using the first marks of said chart;

an internal parameter calculating part for calculating data for calibration under optical conditions under which said images of said chart were photographed based on positions of said second marks extracted by said mark extracting part and a plurality of conditions under which said images of said chart were photographed; and an internal parameter function calculating part for calculating data for calibration corresponding to said varied optical conditions of said camera, using said data for calibration calculated in said internal parameter calculating part and a plurality of optical conditions under which said images of said chart were photographed.

2. The device for measuring data for calibration as claimed in claim 1, wherein said calibration chart is flat, and wherein said plurality of images of said chart are stereo images photographed in such a manner that said data for calibration can be calculated therefrom by said mark extracting part and said internal parameter calculating part.

3. The device for measuring data for calibration as claimed in claim 2, wherein said data for calibration calculated in said internal parameter function calculating part can be continuously calculated according to said varied optical conditions of said camera.

4. The device for measuring data for calibration as claimed in claim 2, wherein said varied optical conditions include at least one of the focal length of a photographing lens of said camera and the position of said lens which is moved to adjust the focus.

5. The device for measuring data for calibration as claimed in claim 2, wherein said data for calibration include at least either of data of the principal position of a lens or the distortion aberration of said lens.

6. The device for measuring data for calibration as claimed in claim 1, wherein said calibration is three-dimensional, and wherein said plurality of images of said chart are stereo images photographed in such a manner that said data for calibration can be calculated therefrom by said mark extracting part and said internal parameter calculating part.

7. The device for measuring data for calibration as claimed in claim 6, wherein said data for calibration calculated in said internal parameter function calculating part can be continuously calculated according to said varied optical photographing conditions of said camera.

8. The device for measuring data for calibration as claimed in claim 6, wherein said optical conditions include at least one of the focal length of a photographing lens of said camera and the position of said lens which is moved to adjust the focus.

9. The device for measuring data for calibration as claimed in claim 6, wherein said data for calibration include at least either of data of the principle position of a lens and the distortion aberration of said lens.

10. The device for measuring data for calibration as claimed in claim 1, wherein said data for calibration calculated in said internal parameter function calculating part can be continuously calculated according to said varied optical conditions of said camera.

11. The device for measuring data for calibration as claimed in claim 1, wherein said varied optical conditions include at least one of the focal length of a photographing lens of said camera and the position of said lens which is moved to adjust the focus.

12. The device for measuring data for calibration as claimed in claim 1, wherein said data for calibration include at least either of data of the principal position of a lens or the distortion aberration of said lens.

13. A method for measuring data for calibration, comprising:

a step of photographing a plurality of images of a calibration chart, with a camera capable of varying its optical characteristics under varied optical conditions; the chart comprising first marks and second marks, the first marks being more easily recognized than the second marks, a mark extracting step for extracting said second marks from said images photographed respectively under the varied optical conditions in at least 3 different photographing angles, the photographing angles being set by using said first markes of said chart; an internal parameter calculating step for calculating data for calibration under which said images of said chart were photographed based on the positions of said extracted second marks;

and an internal parameter function calculating step for calculating data for calibration corresponding to said varied optical photographing conditions of said camera, using said calculated data for calibration and a plurality of optical conditions under which said images of said chart were photographed.

14. A computer readable medium comprising recorded instructions, which if executed would cause a method to be performed for obtaining data for calibration of a camera capable of varying optical conditions, using a plurality of images of a calibration chart comprising first marks and second marks, the first marks being more easily recognized than the second marks, the images being photographed with said camera under varied optical conditions, the method comprising:

extracting said second marks from said images photographed respectively under the varied optical conditions in at least three different photographing angles, the photographing angles being set by using said first marks of said chart;

calculating data for calibration under optical conditions under which said images of said chart were photographed based on the positions of said second marks extracted; and calculating means for calculating data for calibration corresponding to said varied optical photographing conditions of said camera, using said data for calibration and a plurality of optical conditions under which said images of said chart were photographed.

15. A computer readable medium comprising recorded instructions, which if executed would cause a method for measuring data for calibration to be performed, comprising:

obtaining data for calibration of a camera capable of varying its optical conditions, said data for calibration being obtained, using a plurality of images of a calibration chart comprising first marks and second marks, the first marks being more easily recognized than the second marks, the images being photographed with said camera under varied optical conditions;

extracting said second marks from said images photographed respectively under the varied optical conditions in at least three different photographing angles, the photographing angles being set by using said first marks of said chart;

calculating data for calibration under optical conditions under which said images of said chart were photographed based on the positions of said second marks extracted; and calculating data for calibration corresponding to said varied optical photographing conditions of said camera, using said data for calibration and a plurality of optical conditions under which said images of said chart were photographed.

* * * * *

UNITED STATES PATENT AND TRADEMARK OFFICE
CERTIFICATE OF CORRECTION

PATENT NO. : 7,479,982 B2
APPLICATION NO. : 10/612404
DATED : January 20, 2009
INVENTOR(S) : Otani et al.

It is certified that error appears in the above-identified patent and that said Letters Patent is hereby corrected as shown below:

On the Title Page,

Item [*] Notice: Subject to any disclaimer, the term of this patent is extended or adjusted under 35 USC 154(b) by 922 days Delete the phrase "by 922 days" and insert -- by 915 days --

Signed and Sealed this

Twenty-seventh Day of October, 2009

David J. Kappos
*Director of the United States Patent and Trademark Office*